US009492838B2

(12) United States Patent
Williams

(10) Patent No.: US 9,492,838 B2
(45) **Date of Patent: *Nov. 15, 2016**

(54) PRETENSIONER PIVOT DEVICE

(76) Inventor: Makolle Williams, Brooklyn Park, MN (US)

(*) Notice: Subject to any disclaimer, the term of this patent is extended or adjusted under 35 U.S.C. 154(b) by 831 days.

This patent is subject to a terminal disclaimer.

(21) Appl. No.: 13/302,210

(22) Filed: Nov. 22, 2011

(65) Prior Publication Data

US 2012/0163903 A1 Jun. 28, 2012

Related U.S. Application Data

(63) Continuation-in-part of application No. 11/704,573, filed on Feb. 9, 2007, now Pat. No. 8,060,975, which is a continuation-in-part of application No. 11/140,692, filed on May 31, 2005, now abandoned, which is a continuation-in-part of application No. 09/919,534, filed on Jul. 31, 2001, now abandoned, which is a continuation-in-part of application No. 09/490,417, filed on Jan. 24, 2000, now abandoned.

(51) Int. Cl.
*F16B 7/10* (2006.01)
*B05C 17/02* (2006.01)

(52) U.S. Cl.
CPC ......... *B05C 17/022* (2013.01); *B05C 17/0222* (2013.01); *Y10T 403/32426* (2015.01)

(58) Field of Classification Search
CPC ............. Y10T 403/53; Y10T 403/535; Y10T 403/69; Y10T 403/32426; B05C 17/022; B05C 17/0222; F16B 17/00; F16B 21/01; F16B 21/20
USPC .......... 403/90, 91, 99, 101, 102, 109.4, 131, 403/289, 315, 316, 319, 332, 375; 15/230.11; 492/13, 16, 17
See application file for complete search history.

(56) References Cited

U.S. PATENT DOCUMENTS

| | | | | |
|---|---|---|---|---|
| 365,329 | A * | 6/1887 | Cline | 403/74 |
| 1,377,355 | A * | 5/1921 | Knapp | 248/481 |
| 2,310,759 | A * | 2/1943 | Clawson | 173/216 |
| 2,395,245 | A * | 2/1946 | Booharin | 15/144.2 |
| 3,866,257 | A * | 2/1975 | Cansdale, Sr. | 15/230.11 |
| 3,980,500 | A * | 9/1976 | Sorenson | H01M 2/1229 429/54 |
| 5,921,597 | A * | 7/1999 | Thiele | 294/17 |
| 6,702,727 | B2 * | 3/2004 | Karsten | 492/19 |
| 2008/0065074 | A1 * | 3/2008 | Yeung | A61B 17/7032 606/269 |
| 2011/0270317 | A1 * | 11/2011 | Anderson | A61B 17/7071 606/279 |

* cited by examiner

*Primary Examiner* — Gregory Binda
*Assistant Examiner* — Nahid Amiri
(74) *Attorney, Agent, or Firm* — Schwegman Lundberg & Woessner, P.A.

(57) ABSTRACT

A flexure joint interposed between and connecting a first end and a second end has a spherical member, a receiving member configured and arranged to maintain and selectively engage the spherical member, and a connector in communication with the receiving member for releasably locking the spherical member in position as between at least a first locked position and a second locked position relative to the receiving member. Repositioning of the spherical member as between the first and second locked positions is effective for repositioning the shaft relative to the handle as between a first locked position and a second locked position.

10 Claims, 19 Drawing Sheets

PRETENSIONER PIVOT DEVICE

CROSS REFERENCE TO RELATED APPLICATIONS

This application is a continuation-in-part of U.S. application Ser. No. 11/704,573 filed Feb. 9, 2007, now U.S. Pat. No. 8,060,975, which is a continuation-in-part of U.S. application Ser. No. 11/140,692 filed May 31, 2005, now abandoned, which is a continuation-in-part of U.S. application Ser. No. 09/919,534 filed Jul. 31, 2001, now abandoned, which is a continuation-in-part of U.S. application Ser. No. 09/490,417 filed Jan. 24, 2000, now abandoned.

FIELD OF THE INVENTION

The invention relates to devices having a compressible ball rotating within a space smaller than the ball when uncompressed and elements for presetting the tension.

BACKGROUND OF THE INVENTION

Hand-held paint rollers are commonly employed to apply paint to large flat surfaces such as the interior walls of a room and the exterior siding of a residence. Standard paint rollers include a handle, a U-shaped shaft connected to a longitudinal end of the handle, and a tube-receiving frame rotatably connected to the free end of the shaft. The tube-receiving frame is sized to selectively receive and maintain a tubular paint applicator.

By employing a U-shaped shaft, the standard paint roller centrally positions the tubular paint applicator perpendicular to the longitudinal axis of the handle. This orientation allows a person using the paint roller use a painting motion generally parallel to the axis of the user's forearm.

While the U-shaped shaft provides an ergonomic orientation of the handle relative to the tubular paint applicator, the shaft possesses some drawbacks. For example, the U-shaped configuration of the shaft renders it difficult to apply paint to a high horizontal joint, such as the joint between a wall and the ceiling in a room. Because the tubular paint applicator is cylindrical, the applicator cannot contact the wall and/or ceiling within the joint when the applicator is oriented parallel to the joint (i.e., the applicator is rolled towards and away from the joint). Paint can be applied within the joint by orienting the applicator perpendicular to the joint and positioning the free end of the applicator into the joint (i.e., the applicator is rolled along the joint). However, because the U-shaped shaft orientates the tubular paint applicator perpendicular to the handle, the user's forearm must be positioned in-line with the rolling direction of the applicator, thereby requiring the user to be elevated and paint from an awkward and uncomfortable position when painting an elevated horizontal joint.

Other drawbacks associated with the U-shaped handle occur when an elongated handle is employed to allow painting of elevated surfaces without use of a ladder or scaffolding. One such drawback is the difficulty in maintaining a distance between the handle and the vertical surface to be painted, which is sufficient to prevent the handle from contacting the surface and marking the surface. This problem is of particular concern as the length of the elongated handle increases because of the arch created in the elongated handle from the forward force applied in order to maintain the applicator in contact with the surface.

Accordingly, a need exists for an inexpensive paint roller capable of ergonomically allowing the painting of vertical and horizontal surfaces, including elevated vertical and horizontal surfaces, and vertical and horizontal joints, including elevated vertical and horizontal joints, while standing comfortably on the ground at all times.

Without limiting the scope of the invention a brief summary of some of the claimed embodiments of the invention is set forth below. Additional details of the summarized embodiments of the invention and/or additional embodiments of the invention can be found in the Detailed Description of the Invention below.

SUMMARY OF THE INVENTION

In at least one embodiment the inventive paint roller reduces the working forces by 60 to 70%. This may be done by articulating the bearing dynamics of the roller head instead of a shoulder joint and/or rotation of the user's arm and wrist. In some applications of the inventive paint roller the user can paint just by walking horizontally in the presence of any surface while guiding the paint roller as it rest on the work surface.

The inventive paint roller universally articulates and compliments anyone using this type of tool because it substantially reduces up to 70% of the body mechanics that cause carpal tunnel, rotator cuff injuries as well as neck and lower back strains. In some embodiments the user can apply a coating on any surface without using a vertical arm lifting of the roller once it is loaded with paint and placed on a vertical or horizontal surface. In some applications the user does not have to raise his elbow to shoulder height even when painting an overhead surface.

In some applications of the inventive paint roller the user can paint at heights up to twenty feet and "cut in" accurately "the grid" even on a round column, thereby eliminating the inefficient surface strokes that only apply a coating of paint using 25% of the roller surface when using the standard paint roller. Rather, this articulating paint roller using its dynamics would place 100% of the roller on the standing column and apply any coating 360 degrees around the column without the repetitive inefficient vertical stroke employed on such a surface as is common today. The painter simply could position in front of the column, set the roller head in a vertical configuration, and roll the applicator horizontally from the top of column to bottom. If desired the roller could be inverted to complete painting the lower portion of the column. This allows the user of this unique paint roller to avoid having to back away from the painting surface to accomplish long strokes. Such a feature can also allow a user to paint in very tight places.

A first aspect of the invention is a paint roller. The first aspect of the paint roller includes a shaft, a handle attached to a first end of the shaft, and a frame rotatably secured to a second end of the shaft. The frame is configured and arranged for rotation about an axis of rotation and operably engaging a paint roller head. The frame has a proximal end and a distal end with the proximal end spaced in a first axial direction from the distal end and the distal end spaced in a second axial direction from the proximal end. The shaft extends in the first axial direction from the proximal end of the frame and a protrusion extends in the second axial direction from the distal end of the frame. The protrusion is configured and arranged to extend an axial distance beyond a distal end of a paint roller head operably engaged upon the frame to thereby prevent a distal end of a paint roller head operably engaged upon the frame from contacting a surface perpendicular to the axis of rotation. The protrusion can be inserted into an opening on the distal end of the frame.

A second aspect of the invention is also a paint roller. The second aspect of the paint roller includes a shaft, a handle, a flexure joint interposed between and connecting the second end of the handle and the first end of the shaft, and a functional element secured to a second end of the shaft. The flexure joint includes a receiving member, a spherical member, a connector and a spacing adjustment mechanism. The receiving member has first and second transversely spaced opposing arms defining a transverse gap between the arms. The spherical member is positioned within the gap defined by the arms. The connector is in communication with the arms for adjusting the transverse width of the gap occupied by the spherical member as between a closed position effective for locking the spherical member into a fixed rotational position within the gap, and an open position effective for allowing rotation of the spherical member within the gap. The spacing adjustment mechanism is in communication with the arms for adjusting the width of the gap occupied by the spherical member as between a tightened position effective for preventing unintentional rotation of the spherical member within the gap when the connector is in the open position while allowing intentional rotation of the spherical member within the gap by hand, and a loosened position allowing the spherical member to freely rotate within the gap when the connector is in the open position.

A third aspect of the invention is a kit. The kit includes (i) at least one handle, (ii) at least two functional assemblies having different functional elements, and (iii) a flexure joint. Each functional assembly includes at least a shaft and a functional element secured to a second end of the shaft. The flexure joint is configured and arranged to releasably interconnect a second end of the handle and a first end of the shaft. The flexure joint includes (a) a spherical member, (b) a receiving member configured and arranged to maintain and selectively engage the spherical member, and (c) a connector in communication with the receiving member for releasably locking the spherical member in position as between at least a first locked position and a second locked position relative to the receiving member. Repositioning of the spherical member as between the first and second locked positions is effective for repositioning the shaft relative to the handle as between a first locked position and a second locked position.

These and other embodiments of the invention are described and illustrated in the Drawings and the Detailed Description of the Invention below and/or are characterized in the claims annexed hereto.

DETAILED DESCRIPTION OF THE INVENTION

Nomenclature

Figure 1:
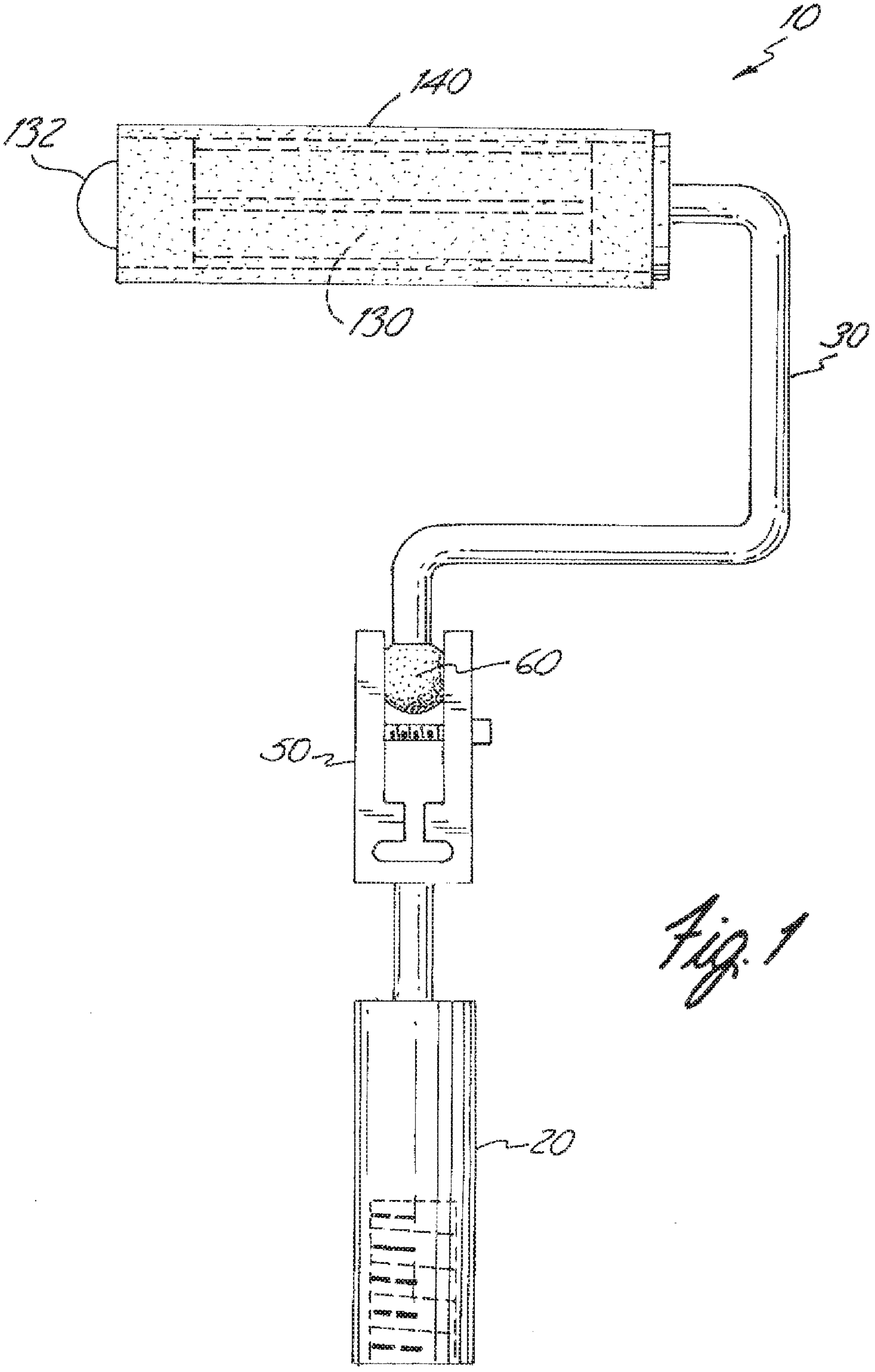
FIG. 1 is a plan view of a first embodiment of a paint roller in accordance with the present invention wherein the shaft is oriented in a first longitudinally aligned position relative to the handle.
Figure 2:
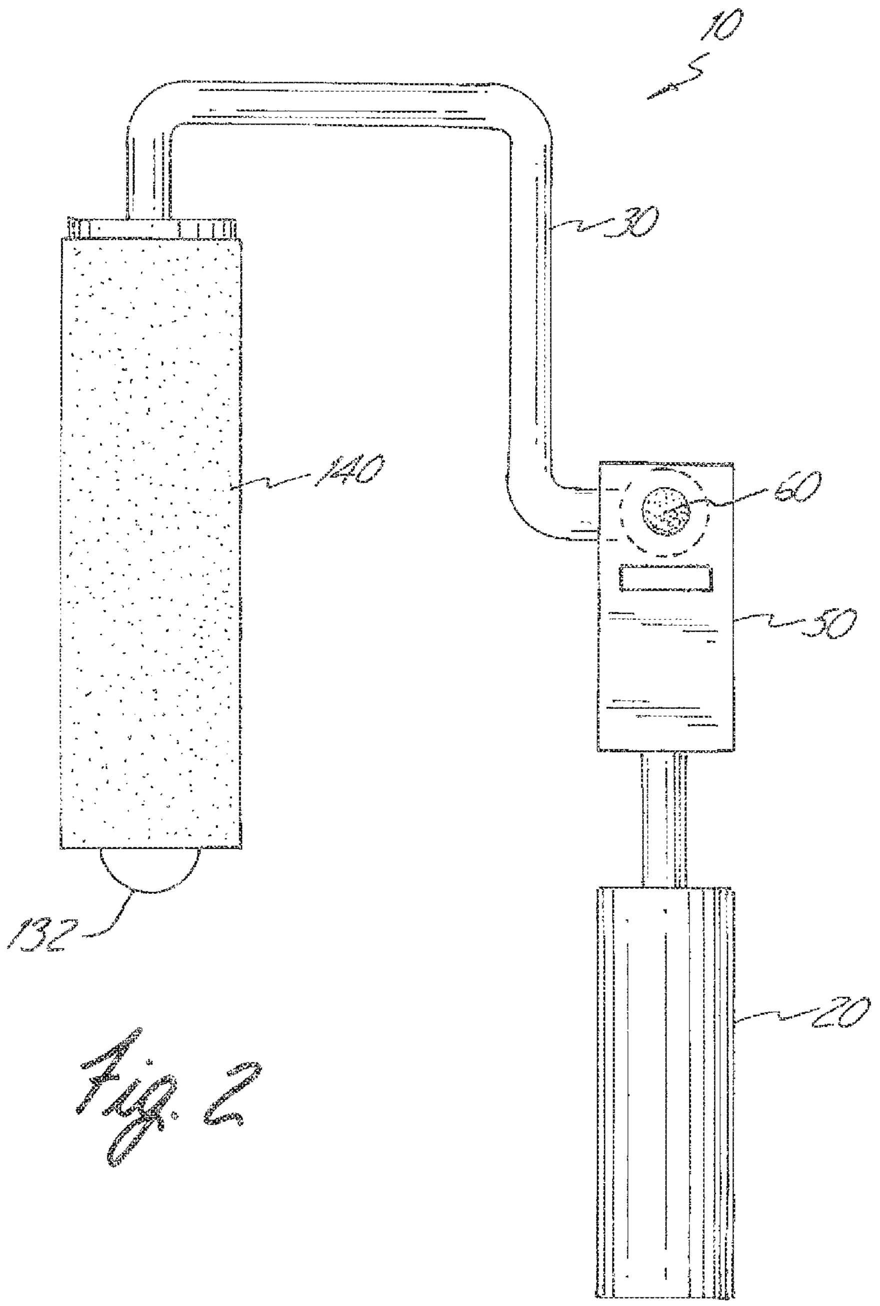
FIG. 2 is a plan view of the paint roller shown in FIG. 1 wherein the shaft is oriented in a second angularly displace position relative to the handle.

10 Paint Roller
20 Handle
20*x* Longitudinal Axis of Handle
21 First End of Handle
22 Second End of Handle
23 Grip Portion of Handle
24 Neck Portion of Handle
29 Longitudinal Bore in Handle
30 Shaft
31 First End Section of Shaft
32 Second End Section of Shaft
33 U-Shaped Section of Shaft
40 Locking Mechanism
41 Distal End of Locking Mechanism
50 Flexure Joint
60 Spherical Member
60*x* Longitudinal Axis of Spherical Member
60*y* Latitudinal Axis of Spherical Member
60*z* Transverse Axis of Spherical Member
70 Collar
79 Threaded Bore in Collar
80 Receiving Member
80*x* Longitudinal Axis of Receiving Member
80*y* Latitudinal Axis of Receiving Member
80*z* Transverse Axis of Receiving Member
81 Shoulder Portion of Receiving Member
82 Clamping Portion of Receiving Member
83 First Arm
83*d* Distal End of First Arm
83*p* Proximal End of First Arm
83*i* Inner Surface of First Arm
83*o* Outer Surface of First Arm
84 Second Arm

84*d* Distal End of Second Arm
84*p* Proximal End of Second Arm
84*i* Inner Surface of Second Arm
84*o* Outer Surface of Second Arm
85 Threaded Longitudinal Bore in Shoulder Portion of Receiving Member
86 Transverse Pin Passage in Shoulder Portion of Receiving Member
87 Gap Separating First and Second Arms
87*d* Distal Region of Gap
87*m* Middle Region of Gap
87*p* Proximal Region of Gap
88' Aperture Through First Arm
88" Aperture Through Second Arm
89' Connector Receiving Bore Through First Arm
89" Connector Receiving Threaded Bore in Second Arm
90' Spacing Adjustment Mechanism Receiving Bore Through First Arm
90" Spacing Adjustment Mechanism Receiving Threaded Bore in Second Arm
91' Concave Channel Formed in Inner Surface of First Arm
91" Concave Channel Formed in Inner Surface of Second Arm
100 Connector
101 Shank of Connector
102 Head of Connector
110 Washer
120 Spacing Adjustment Mechanism
121 Shank of Bolt
122 Head of Bolt
130 Tube-Receiving Frame
131 Axially Extending Rods of Tube-receiving Frame
132 Axially Extending Protrusion
149 Tubular Paint Applicator
x Longitudinal Direction
y Latitudinal Direction
z Transverse Direction

DEFINITIONS

As utilized herein, including the claims, the phrase "different functional elements" means functional elements that differ in one or more of size (e.g., 3 inch, 4 inch, 6 inch, 9 inch, and 18 inch long frames for paint rollers), shape (e.g., round sanding pad, rectangular sanding pad, V-shaped sanding pad, etc.), material of construction (e.g., foam paint brush, synthetic bristle paint brush, natural bristle paint brush, etc.), or functionality (e.g., squeegee, sweeping brush, wire brush, scraper, paint roller, paint brush, painting pad, sanding pad, etc.).

Construction

First Embodiment

One embodiment of the paint roller 10 is shown in FIGS. 1-4. The paint roller 10 includes a handle 20, a shaft 30, a flexure joint 50, a connector 100, and a tube-receiving frame 130. The tube-receiving frame 130 is configured and arranged to accept a tubular paint applicator 140. The second end 22 of the handle 20 is selectively secured to the first end section 31 of the shaft 30 by the flexure joint 50. The tube-receiving frame 130 is rotatably secured to the second end 32 of the shaft 30.

The handle 20 preferably includes a grip portion 23 and a neck portion 24. The grip portion 23 may be constructed from any number of materials possessing the necessary structural integrity including specifically but not exclusively, aluminum, ceramic, wood and molded plastic. The grip portion 23 is preferably sized to comfortably rest within a user's hand (not shown). In this regard, the grip portion 23 may include finger articulations for enhancing fit with a user's hand. The neck portion 24 extends from the grip portion 23 at the second end 22 of the handle 20 and is preferably made of a rigid material, such as mild steel or stainless steel. The neck portion 24 of the handle 20 terminates at the flexure joint 50. While the grip portion 23 and the neck portion 24 have been described as separate components, the handle 20 may be integrally formed of a single material. In fact, the neck portion 24 can be eliminated. The handle 20 can be configured and arranged with other shapes, sizes, configurations, and/or constructions known in the art.

The handle 20 preferably includes a threaded longitudinal bore 29 accessible from the first end 21 of the handle 20 for receiving and threadably engaging a standard extension pole (not shown).

The shaft 30 forms an appropriate U-shape, and includes a first end section 31, a second end section 32, and a U-shaped central section 33. The first end section 31 is secured to a component of the flexure joint 50. The second end section 32 is rotatably secured to the tube-receiving frame 130. The shaft 30 is preferably a rigid rod, formed from any material possessing the necessary structural integrity such as aluminum, mild steel, stainless steel, and molded plastic. The shaft 30 can be configured with any desired configuration, but preferably approximates the ergonomic U-shape of the standard paint roller.

The tube-receiving frame 130 is of a type commonly known in the art and is rotatably secured to the second end 32 of the shaft 30. In this regard, the tube-receiving frame 130 may include radial bearings (not shown) at either end of the tube-receiving frame 130 to provide rotatable association with the shaft 30. The tube-receiving frame 130 preferably includes axially extending rods 131 sized to frictionally maintain the tubular paint applicator 140 in position. Other functional elements may also be secured to the second end 32 of the shaft 30 including specifically, but not exclusively, a sweeping brush, a wire brush, a scrapper, a painting pad, and a sanding pad.

A protrusion 132, preferably a sphere or spherical sector, extends axially outward from the distal end (unnumbered) of the tube receiving frame 130. The protrusion 132 extends a sufficient distance in the axial direction that the protrusion 132 will extend beyond a distal end (unnumbered) of a paint roller head 140 operably engaged upon the frame 130 so that the distal end of a paint roller head 140 operably engaged upon the frame 130 will not contact a surface positioned perpendicular to the axis of rotation of the frame 130. Accordingly, the protrusion 132 is effective for preventing the distal end of a paint roller head 140 operably engaged upon the frame 130 from accidentally contacting and applying paint onto an adjacent ceiling, floor or wall when painting along a corner.

The flexure joint 50 is configured to provide repositionable "locked" orientation of the shaft 30 relative to the handle 20. The flexure joint 50 includes a spherical member 60, a receiving member 80, and a connector 100. In a preferred embodiment, the spherical member 60 is attached at the free end (unnumbered) of the first end section 31 of the shaft 30 and the receiving member 80 is attached to the neck portion 24 of the handle 20. Alternatively, attachment of the spherical member 60 and the receiving member 80 can be reversed, with the spherical member 60 attached to the neck portion 24 of the handle 20 and the receiving member 80 attached at the free end (unnumbered) of the first end section 31 of the shaft 30. For purposes of enhancing lucidity of the disclosure, the balance of the detailed description shall be set forth in connection with the embodiment of the paint roller 10 in which the spherical member 60 is attached at the end of the first end section 31 of the shaft 30 and the receiving member 80 is attached to the neck portion 24 of the handle 20. However, it is to be understood that the disclosure applies equally to the embodiment in which the spherical member 60 is attached to the neck portion 24 of the handle 20 and the receiving member 80 attached at the free end (unnumbered) of the first end section 31 of the shaft 30.

The spherical member 60 can be constructed from any material possessing the necessary structural integrity, such as a mild steel or stainless steel ball bearing. The spherical member 60 is preferably constructed from a slightly compressible material capable of structurally surviving the torsion forces placed upon the spherical member 60 during normal use of the paint roller 10, such as a high durometer rubber. In some embodiments the spherical member comprises a compound in the nitrile group (e.g. nitrile rubber), and in some embodiments can have a durometer measurement of 90-95. The spherical member 60 preferably has a diameter of approximately 0.687 inches, although other diameters are equally acceptable. It should be noted that the spherical member can also have an elliptical or oval cross-section that is not a circle. In some embodiments the spherical member has an uncompressed diameter that is substantially different from that of a compressed diameter; the compressed diameter may have a more elliptical or oval cross-section than the uncompressed diameter such that in a first direction the compressed diameter is less than the uncompressed diameter. In some embodiments, a spherical member 60 having an uncompressed diameter is deformed into having a compressed diameter when received within the receiving member 80. When in the compressed diameter the diameter of the spherical member is lengthened in one direction and shortened in another direction. In some embodiments the lengthened diameter and the shortened diameter are substantially perpendicular to one another.

The spherical member 60 preferably has a radial bore (not shown) for accepting insertion of the free end (unnumbered) of the first end section 31 of the shaft 30 and thereby facilitating attachment of the shaft 30 to the spherical member 60. The spherical member 60 can be attached by any of the attachment techniques known in the art, such as threading, adhesives, frictional fit, welding, etc. The spherical member 60 can also be integrally formed with the shaft 30.

Figure 3:
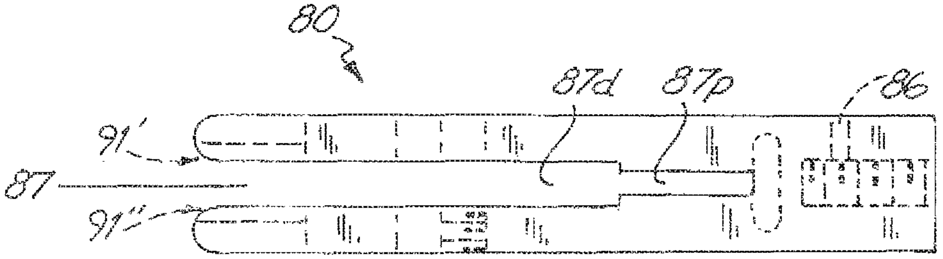
FIG. 3 is a front view of the receiving member portion of the paint roller shown in FIG. 1.
Figure 4:
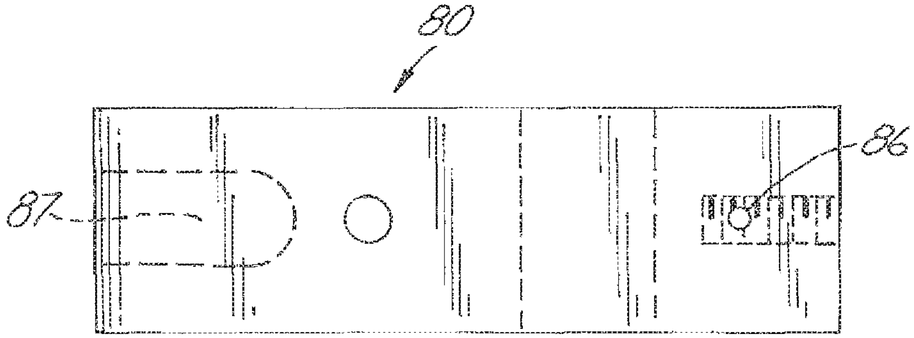
FIG. 4 is a left side view of the receiving member shown in FIG. 3.

The receiving member 80 is shown in greater detail in FIGS. 3 and 4. In a preferred embodiment, the receiving member 80 is generally Y-shaped, defined by a shoulder portion 81 and a clamping portion 82. The clamping portion 82 includes transversely spaced first and second arms, 83 and 84, which longitudinally extend in a substantially uniform fashion from the shoulder portion 81.

A threaded longitudinal bore 85 is preferably provided in the shoulder portion 81 of the receiving member 80 for threadably engaging the neck portion 24 of the handle 20. A transverse pin passage 86 preferably extends through the shoulder portion 81 and through the longitudinal bore 85. The transverse pin passage 86 is sized to receive and frictionally maintain a roll pin (not shown) for preventing unintentional loosening of the neck portion 24 from within the longitudinal bore 85 in the shoulder portion 81 of the receiving member 80. Alternatively, the shoulder portion 81 of the receiving member 80 can be configured to accommodate other forms of attachment to the neck portion 24 of the handle 20 such as by a weld, adhesive, etc. With these alternative configurations, one or both of the longitudinal bore 85 and the transverse pin passage 86 can be eliminated.

The clamping portion 82 of the receiving member 80 includes opposed first and second arms 83 and 84, separated by a gap 87. In this regard, arms 83 and 84 preferably extend in a substantially identical fashion from the shoulder portion 81 of the receiving member 80. Each of the first arm 83 and second arm 84 has an inner surface 83*i* and 84*i*, and an outer surface 83*o* and 84*o*, respectively. Transversely aligned apertures 88', 88", and transversely aligned connector receiving bores 89' and 89" extend through the first and second arms 83 and 84, respectively. The apertures 88' and 88" are longitudinally spaced from the connector receiving bores 89' and 89" towards the distal ends 83*d* and 84*d* of the first and second arms 83 and 84 respectively.

The first and second arms 83 and 84 are preferably formed such that the outer surfaces 83*o* and 84*o* of the arms 83 and 84 are substantially flat and have a width in the range of 0.5-1.5 inches, more preferably in the range of 0.75-1.25 inches, and most preferably approximately 1 inch. The inner surfaces 83*i* and 84*i* of the first and second arms 83 and 84 are also preferably substantially flat with mirror image longitudinally extending concave channels 91' and 91" formed by the inner surfaces 83*i* and 84*i* of each arm 83 and 84 respectively. The concave channels 91' and 91" are preferably formed as mirror images, with each channel 91' and 91" extending from the distal end 83*d* and 84*d* of the corresponding arm 83 and 84 to at least the apertures 88' and 88" in the corresponding arm 83 and 84. The concave channels 91' and 91" are sized in accordance with the diameter of the spherical member 60 to facilitate initial introduction of the spherical member 60 into frictional engagement within the gap 87 between the arms 83 and 84 and transversely centered within the apertures 88' and 88". Thus in a preferred embodiment, the transverse height of the gap 87 between the arms 83 and 84 is substantially less than the diameter of the spherical member 60 except at the nadirs (unnumbered) of the concave channels 91' and 91" where the transverse height of the gap 87 is only slightly smaller than the diameter of the spherical member 60 so as to facilitate initial introduction of the spherical member 60 within the gap 87 separating the arms 83 and 84 with the spherical member 60 transversely centered within the apertures 88' and 88" in the arms 83 and 84. Alternatively, other assembly techniques may be employed in which the concave channels 91' and 91" need not be formed.

As depicted in FIG. 3, the gap 87 separates the first arm 83 and second arm 84 and extends the entire longitudinal length and lateral width of the clamping portion 82 of the receiving member 80. The gap 87 preferably defines a distal region 87*d* and a proximal region 8'7*p* with the transverse height of the gap 87 in the distal region 87*d* greater than the height of the gap 87 in the proximal region 87*p*. In other words, the transverse spacing between the first arm 83 and the second arm 84 is greater within the distal region 87*d* of the gap 87 than the proximal region 87*p* of the gap 87. The distal region 87*d* preferably encompasses the apertures 88' and 88" and the connector receiving bores 89' and 89". The transverse height of the distal region 87*d* is selected to accommodate the spherical member 60 within the gap 87, accommodate passage of the first end section 31 of the shaft 30 into the gap 87 and into engagement with the spherical member 60 retained within the gap 87, and permit lateral pivoting of the first end section 31 of the shaft 30 within the gap 87. More particularly, the transverse height of the distal region 87*d* is preferably less than the diameter of the spherical member 60 such that the spherical member 60 is retainable between the first arm 83 and the second arm 84 when the connector 100 is in a disengaged condition. In addition, the transverse height of the distal region 87*d*, the diameter of the spherical member 60 and the thickness of the first end section 31 of the shaft 30 are preferably selected so that the shaft 30 does not interfere with locking engagement of the spherical member 60 between the arms 83 and 84 by actuation of the connector 100. Generally, a transverse height of approximately 0.4 inches is acceptable. Alternatively, other transverse heights are equally acceptable.

As described below, the gap 87 allows the first arm 83 and second arm 84 to be deflected toward or away from one another by actuation of the connector 100 so as to lock the spherical member 60 in position relative to the receiving member 80 when in an engaged condition and allow repositioning of the spherical member 60 relative to the receiving member 80 when in a disengaged condition. A variety of factors can impact the extent to which the first arm 83 and second arm 84 can be deflected, including the material of construction, the longitudinal length of the arms 83 and 84 defined by the longitudinal length of the gap 87, the thickness of the first arm 83 and second arm 84 proximate the shoulder portion 81 of the receiving member 80, the longitudinal placement of the apertures 88' and 88", and the longitudinal placement of the connector receiving bores 89' and 89". As shown in FIG. 3, the gap 87 can be configured with a proximal region 87*p* having a transverse height which is less than the transverse height of the distal region 87*d* for purposes of increasing the longitudinal length of the gap 87 and thereby facilitating deflection of the arms 83 and 84, while providing a strong clamping action. Alternatively, the gap 87 can be formed with a relatively uniform height along the entire longitudinal length of the gap 87.

Transversely aligned and transversely extending apertures 88' and 88" are formed in the first and second arms 83 and 84 respectively. The apertures 88' and 88" are configured and arranged to receive and maintain the spherical member 60. In a preferred embodiment, favored for ease of manufacture, the apertures 88' and 88" extend completely through the respective arm 83 and 84. Alternatively, the apertures 88' and 88" may be formed as a cylindrical concavity which does not extend completely through the arms 83 or 84, or may be formed as a dimple in the inner surface 83*i* and 84*i* of the respective arm 83 and 84. The apertures 88' and 88" have a diameter which is smaller than the diameter of the spherical member 60 to prevent the spherical member 60 from passing completely through the apertures 88' and 88". For example, a spherical member 60 having a diameter of 0.687 inches can be satisfactorily accommodated within apertures 88' and 88" having a diameter of 0.5 inches. Alternatively, other dimensions are equally acceptable.

The transversely aligned connector receiving bores 89' and 89" in the first and second arms 83 and 84 respectively, are longitudinally spaced from apertures 88' and 88" towards the shoulder portion 81 of the receiving member 80. The connector receiving bores 89' and 89" are longitudinally spaced from apertures 88' and 88" a distance sufficient to prevent the connector 100 from contacting and interfering with rotation of the spherical member 60 when the connector 100 is operably positioned within the connector receiving bores 89' and 89". However, the connector receiving bores 89' and 89" are preferably placed in relatively close longitudinal proximity to apertures 88' and 88" as the actuation force required to lock the spherical member 60 into position is reduced by positioning the connector 100 as close as possible to the distal ends 83*d* and 84*d* of the arms 83 and 84 respectively. For example, a center to center spacing of about 0.625 inches from the connector receiving bores 89' and 89" to the corresponding apertures 88' and 88" in each arm 83 and 84 is effective when the spherical member 60 has a diameter of 0.5 inches and the shank 101 of the connector 100 has a diameter of 0.25 inches.

The connector receiving bores 89' and 89" are configured to selectively retain the connector 100 as between an engaged condition wherein the arms 83 and 84 are deflected towards one another and the spherical member 60 is locked in position, and a disengaged condition wherein the arms 83 and 84 are not deflected and the spherical member 60 can be rotatably repositioned relative to the receiving member 80. For example, in one embodiment, the connector receiving bore 89' through the first arm 83 slidably engages the shank 101 of the connector 100 while preventing passage of the head 102 of the connector 100, while the connector receiving bore 89" through the second arm 84 is threaded for threadably engaging the shank 101 of the connector 100. Alternatively, other attachment configurations are equally acceptable.

The entire receiving member 80, including the shoulder portion 81 and the clamping portion 82 is preferably a one-piece member integrally formed from a high strength deflectable material such as T6 aluminum.

The shaft 30 and thereby the tube-receiving frame 130 can be manually repositioned relative to the handle 20 after the connector 100 is loosened. The shaft 30 can be rotated about the longitudinal axis 20*x* of the handle 20 by effecting rotation of the spherical member 60 about the longitudinal axis 60*x* of the spherical member 60 within the receiving member 80. In addition, the shaft 30 can be laterally repositioned relative to the handle 20 by effecting rotation of the spherical member 60 about the transverse axis 60*z* of the spherical member 60 within the receiving member 80. Transverse repositioning of the shaft 30 relative to the handle 20 is limited by arms 83 and 84, which prevent continued transverse movement of the spherical member 60 because the distal ends 83*d* and 84*d* of the arms 83 and 84 contact the first end section 31 of the shaft 30. Thus, the flexure joint 50 effectively provides two degrees of freedom of movement.

The flexure joint 50 can be configured and arranged to allow (i) 360° rotation of the shaft 30 about the longitudinal axis 20*x* of the handle 20, and (ii) at least a 30°, preferably at least a 60°, and most preferably at least a 90°, rotation of the shaft 30 about the transverse axis 60*z* of the spherical member 60 in both clockwise and counter-clockwise directions from the longitudinal axis 20*x* of the handle 20.

Once the shaft 30 and thus the tube-receiving frame 130 and tubular paint applicator 140 is located in the desired angular and rotational position relative to the handle 20, the shaft 30 can be locked into position by tightening the connector 100 so as to lock the spherical member 60 into position within the clamping portion 82 of the receiving member 80. The paint roller 10 is then available for use.

The tube-receiving frame 130 and tubular paint applicator 140 can be quickly and easily repositioned relative to the handle 20 by loosening the connector 100, effecting the desired amount of rotational and angular repositioning of the shaft 30 relative to the receiving member 80, and then retightening the connector 100.

The paint roller 10 with flexure joint 50 of the present invention provides a marked improvement over the standard paint roller design. By providing a user with the ability to easily change orientation of an attached tubular paint applicator 140 relative to the handle 20, a wide variety of new applications for the paint roller 10 are now available. For example, a simple rotation of the shaft 30 relative to the handle 20 facilitates painting a corner. Additionally, transversely angling the tubular paint applicator 140 from the longitudinal axis 20*x* of the handle 20 facilitates the horizontal painting of elevated surfaces. Finally, the ability to adjust the position of the tubular paint applicator 140 relative to the handle 20 allows the paint roller 10 to be used in a more ergonomically correct position for a variety of painting directions and positions, thus minimizing the stresses placed upon the wrist, arm, shoulder and back of a user.

Although the present invention has been described with reference to preferred embodiments, workers skilled in the art recognize that changes may be made in form and detail without departing from the spirit and scope of the invention. For example, the paint roller 10 of the present invention has been described as relating to a standard size. It would be recognized by those skilled in the art that the paint roller 10 can be constructed to substantially any desired sized. In addition, the paint roller 10 may utilize a shaft 30, which does not have the standard U-shaped section 33. Similarly, while the spherical member 60 has been described as round with a smooth surface, other shapes and surface textures, such as an egg shaped member with a knurled surface, may also be employed.

In light of the disclosure provided herein, other options for providing the desired lateral repositionability of the shaft 30 relative to the handle 20 would be known to those skilled in the art. One such option is replacement of the spherical member 60 and associated apertures 88' and 88" in the arms 83 and 84 with a spindle (not shown) rotatably mounted within bearings (not shown) in the arms 83 and 84. The spindle version would further replace the connector 100 and connector receiving bores 89' and 89" in the arms 83 and 84 with a releasable catch system such as a ratchet-type assembly (not shown) or a pin retention system (not shown) for locking the spindle into position.

It is not necessary that the flexure joint 50 provide the multiple degrees of freedom offered by the preferred embodiments disclosed herein. The claimed invention includes paint rollers 10 having a flexure joint 50, which provides a single degree of freedom.

Second Embodiment

A second embodiment of the paint roller 10 is shown in FIGS. 5 through 17. The second embodiment of the paint roller 10 is similar in many respects to the first embodiment of the paint roller 10. Accordingly, similar components and features will be identified by the same reference numeral.

Figure 5:
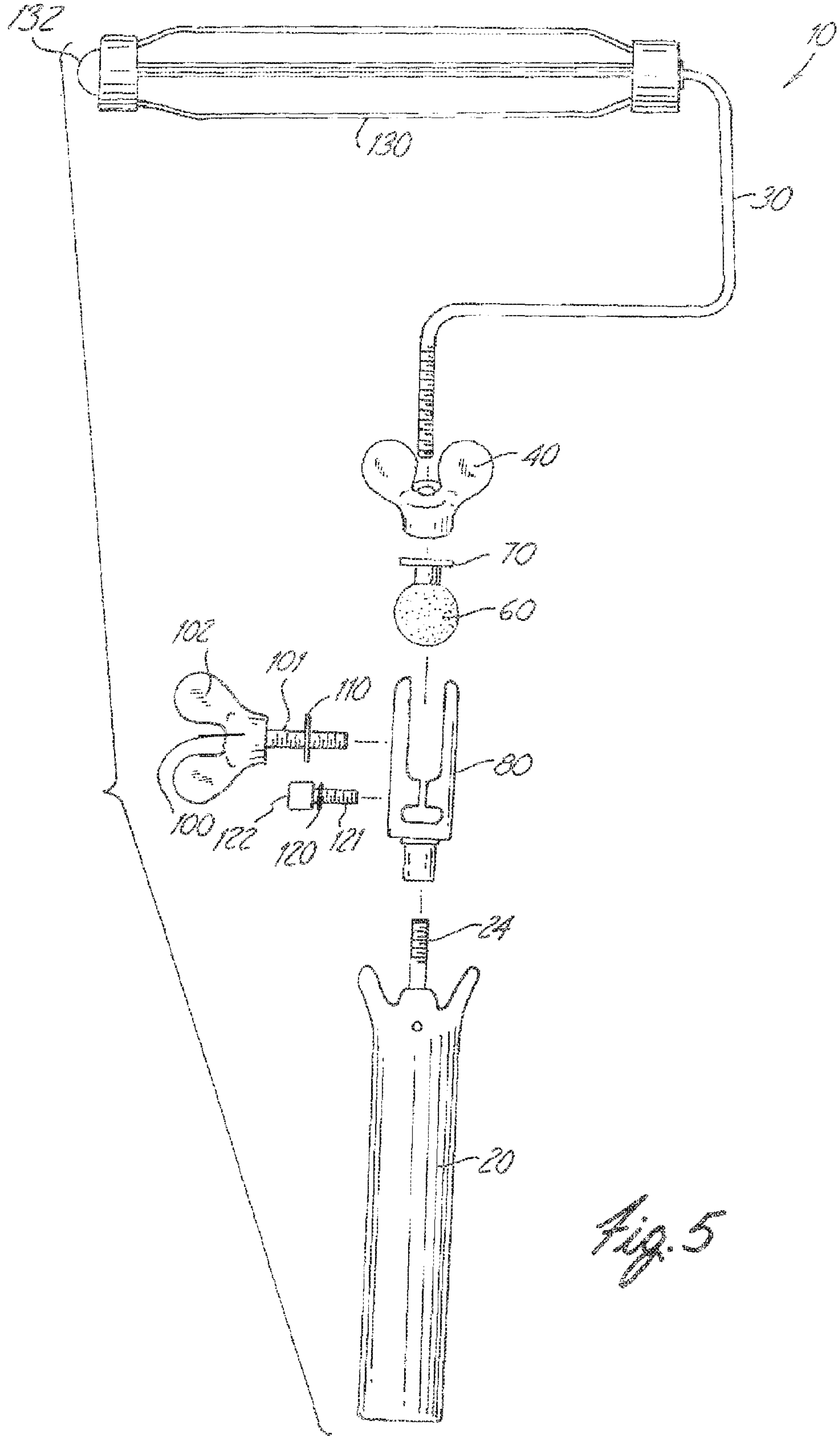
FIG. 5 is an exploded plan view of a second embodiment of a paint roller in accordance with the present invention.
Figure 6:
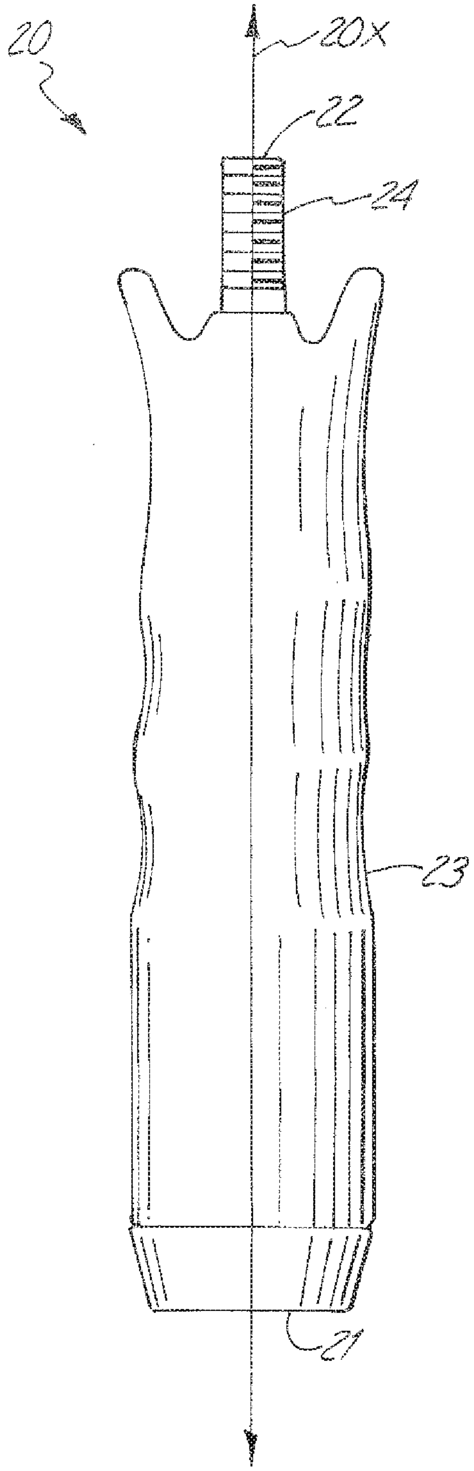
FIG. 6 is a front view of the handle shown in FIG. 5.
Figure 7:
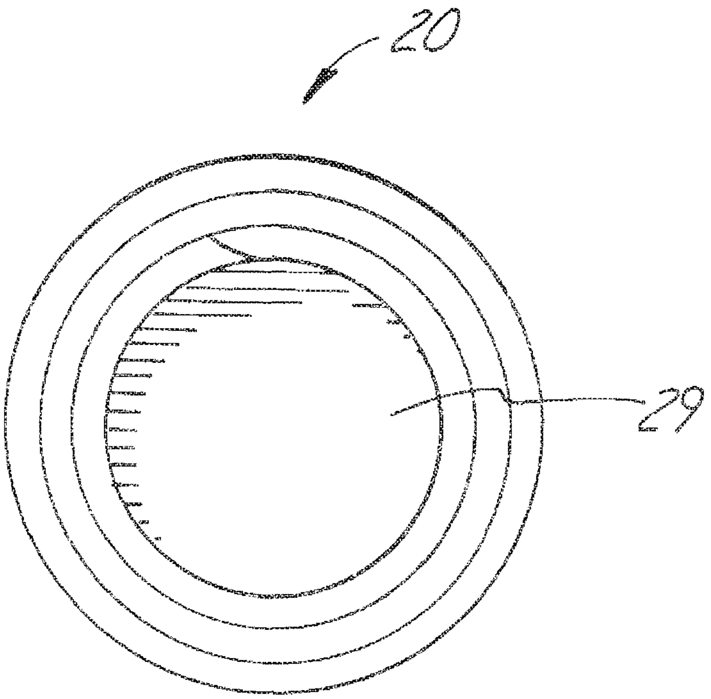
FIG. 7 is an end view of the first end of the handle shown in FIG. 5.

Referring to FIG. 5, the paint roller 10 includes a handle 20, a shaft 30, a locking mechanism 40, a flexure joint 50, a connector 100, a spacing adjustment mechanism 120, and a tube-receiving frame 130. The tube-receiving frame 130 is configured and arranged to accept a tubular paint applicator 140. The second end 22 of the handle 20 is selectively secured to the first end section 31 of the shaft 30 by the flexure joint 50. The tube-receiving frame 130 is rotatably secured to the second end 32 of the shaft 30.

The handle 20 preferably includes a grip portion 23 and a neck portion 24. The grip portion 23 may be constructed from any number of materials possessing the necessary structural integrity including specifically but not exclusively, aluminum, ceramic, wood and molded plastic. The grip portion 23 is preferably sized to comfortably rest within a user's hand (not shown). In this regard, the grip portion 23 may include finger articulations for enhancing fit with a user's hand. The neck portion 24 extends from the grip portion 23 at the second end 22 of the handle 20 and is preferably made of a rigid material, such as mild steel or stainless steel. The neck portion 24 of the handle 20 terminates at the flexure joint 50. While the grip portion 23 and the neck portion 24 have been described as separate components, the handle 20 may be integrally formed of a single material. In fact, the neck portion 24 can be eliminated. The handle 20 can be configured and arranged with other shapes, sizes, configurations, and/or constructions known in the art.

The handle 20 preferably includes a threaded longitudinal bore 29 accessible from the first end 21 of the handle 20 for receiving and threadably engaging a standard extension pole (not shown).

The shaft 30 forms an appropriate U-shape, and includes a first end section 31, a second end section 32, and a U-shaped central section 33. The first end section 31 is secured to a component of the flexure joint 50. The second end section 32 is rotatably secured to the tube-receiving frame 130. The shaft 30 is preferably a rigid rod, formed from any material possessing the necessary structural integrity such as aluminum, mild steel, stainless steel, and molded plastic. The shaft 30 can be configured with any desired configuration, but preferably approximates the ergonomic U-shape of the standard paint roller.

The tube-receiving frame 130 is of a type commonly known in the art and is rotatably secured to the second end 32 of the shaft 30. In this regard, the tube-receiving frame 130 may include radial bearings (not shown) at either end of the tube-receiving frame 130 to provide rotatable association with the shaft 30. The tube-receiving frame 130 preferably includes axially extending rods 131 sized to frictionally maintain the tubular paint applicator 140 in position. Other functional elements may also be secured to the second end 32 of the shaft 30 including specifically, but not exclusively, a sweeping brush, a wire brush, a scrapper, a painting pad, and a sanding pad.

The flexure joint 50 is configured to provide repositionable "locked" orientation of the shaft 30 relative to the handle 20. The flexure joint 50 includes a spherical member 60, a collar 70, a receiving member 80, a connector 100, and a spacing adjustment mechanism 120. In a preferred embodiment, the spherical member 60 is attached to the free end (unnumbered) of the first end section 31 of the shaft 30 and the receiving member 80 is attached to the neck portion 24 of the handle 20. Alternatively, attachment of the spherical member 60 and the receiving member 80 can be reversed, with the spherical member 60 attached to the neck portion 24 of the handle 20 and the receiving member 80 attached to the free end (unnumbered) of the first end section 31 of the shaft 30. For purposes of enhancing lucidity of the disclosure, the balance of the detailed description shall be set forth in connection with the embodiment of the paint roller 10 in which the spherical member 60 is attached to the free end (unnumbered) of the first end section 31 of the shaft 30 and the receiving member 80 is attached to the neck portion 24 of the handle 20. However, it is to be understood that the disclosure applies equally to the embodiment in which the spherical member 60 is attached to the neck portion 24 of the handle 20 and the receiving member 80 attached to the free end (unnumbered) of the first end section 31 of the shaft 30.

The spherical member 60 can be constructed from any material possessing the necessary structural integrity, such as a mild steel or stainless steel ball bearing. The spherical member 60 is preferably constructed from a slightly compressible material capable of structurally surviving the torsion forces placed upon the spherical member 60 during normal use of the paint roller 10, such as a high durometer rubber. The spherical member 60 preferably has a diameter of approximately 0.687 inches, although other diameters are equally acceptable.

The spherical member 60 can be directly attached to the free end (unnumbered) of the first end section 31 of the shaft 30. In a preferred embodiment, the spherical member 60 is molded around a radially extending collar 70 with a radially extending threaded bore 79 provided in the collar 70 for threadably engaging the free end (unnumbered) of the first end section 31 of the shaft 30 and thereby providing rotatable attachment of the shaft 30 to the spherical member 60.

Figure 11:
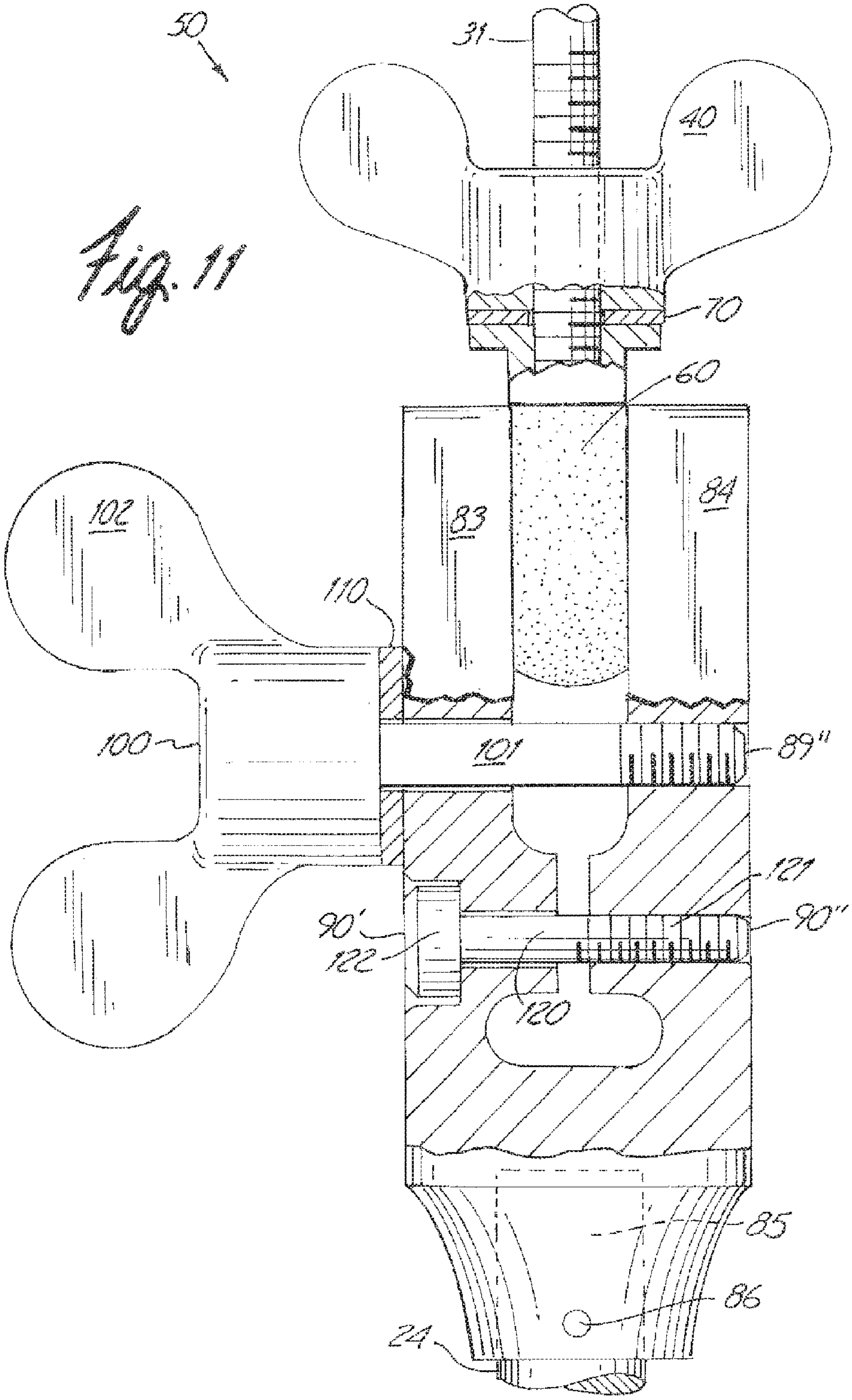
FIG. 11 is a front view of the receiving member shown in FIG. 5 with portions of the receiving member removed to depict the transverse bores extending through the receiving member.
Figure 12:
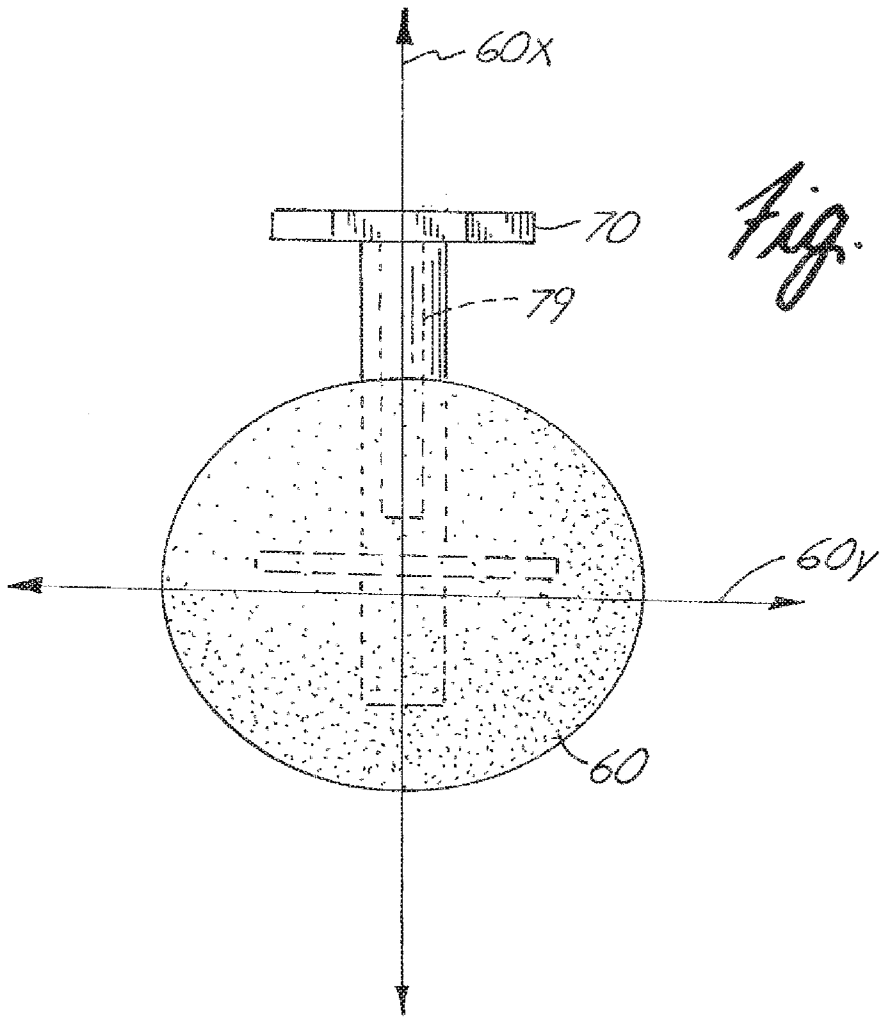
FIG. 12 is a front view of the spherical member shown in FIG. 5.
Figure 13:
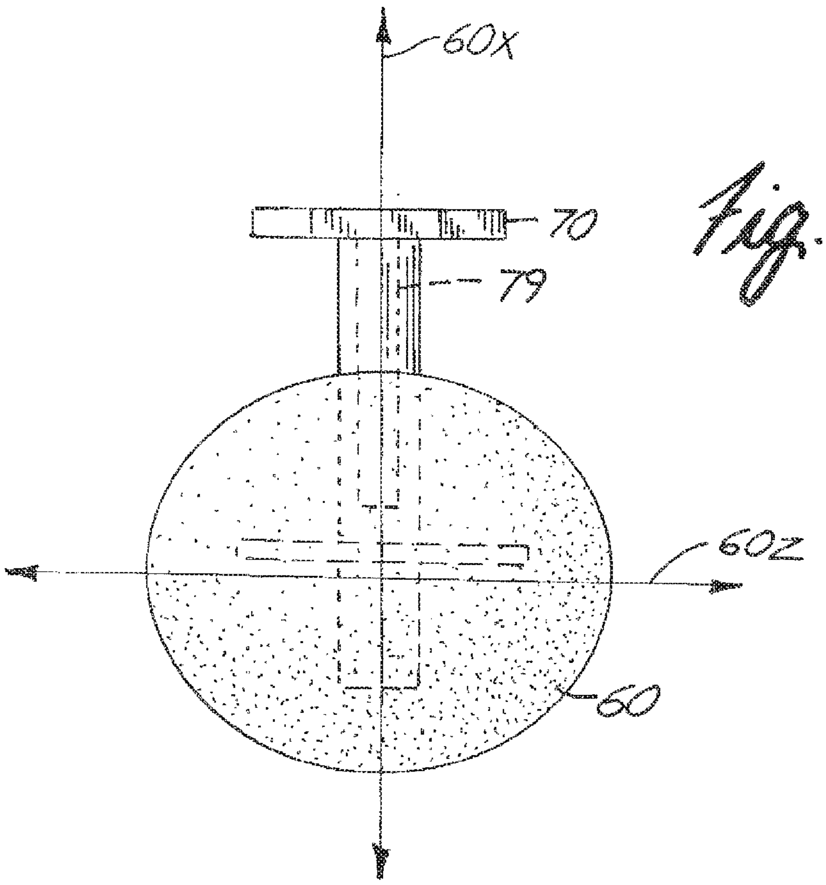
FIG. 13 is a side view of the spherical member shown in FIG. 5.
Figure 14:
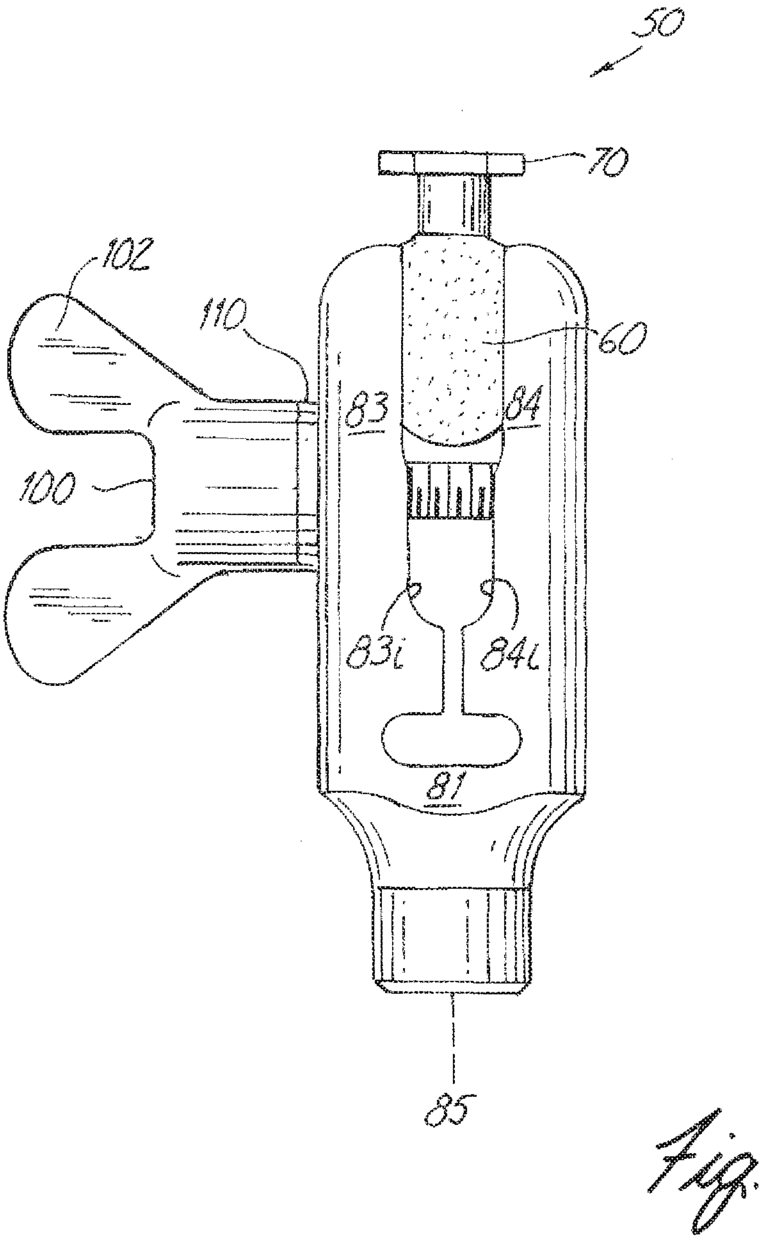
FIG. 14 is a front view of the fully assembled flexure joint shown in FIG. 13.
Figure 15:
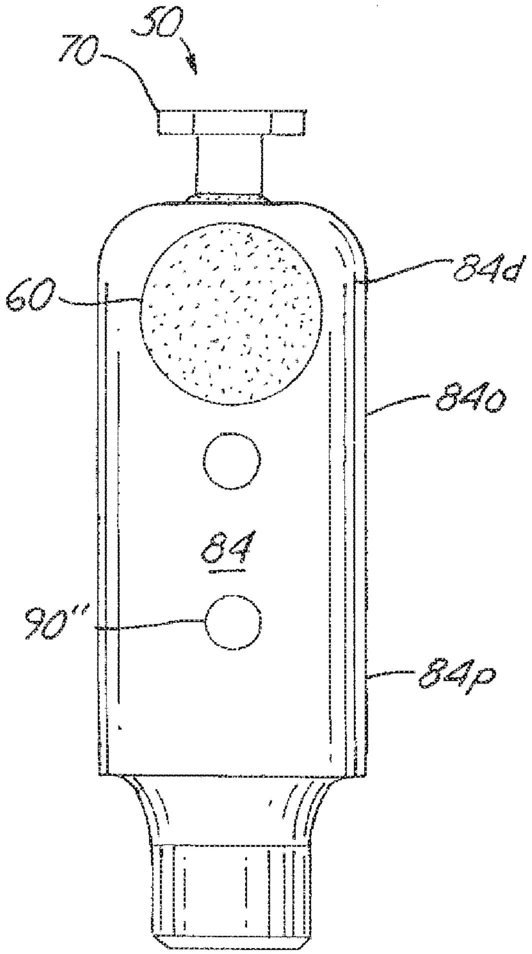
FIG. 15 is a right side view of the fully assembled flexure joint shown in FIG. 13.
Figure 16:
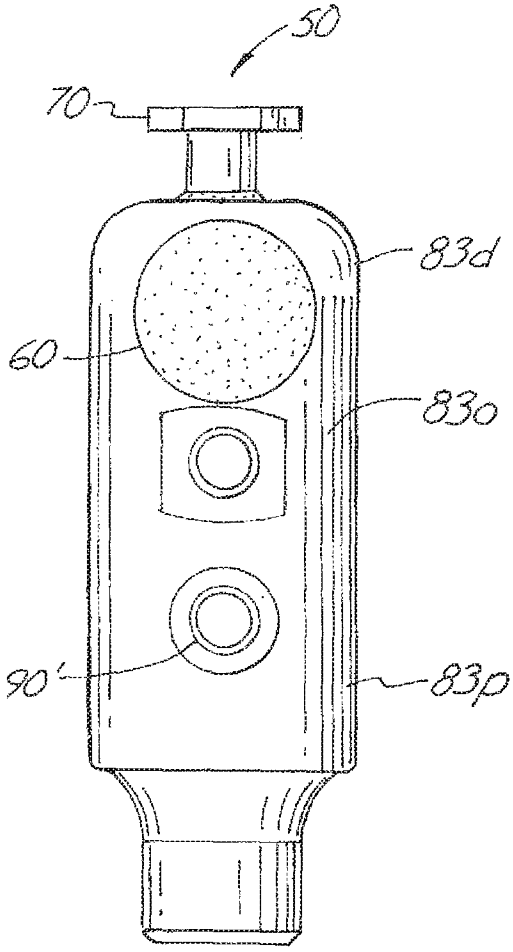
FIG. 16 is a left side view of the fully assembled flexure joint shown in FIG. 13.
Figure 17:
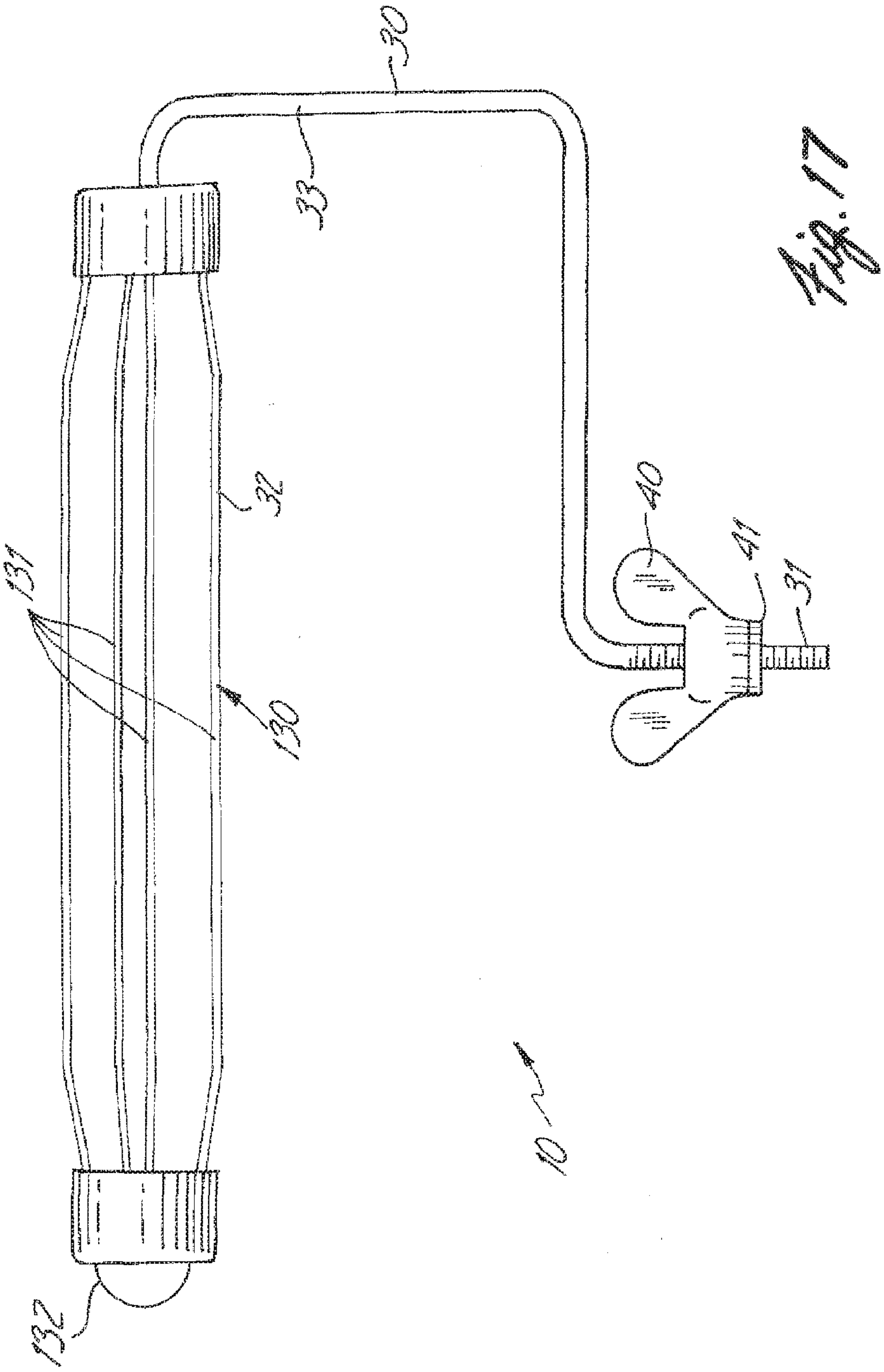
FIG. 17 is a front view of the assembled shaft and locking mechanism shown in FIG. 5.

A locking mechanism 40 is provided for locking the shaft 30 in a selected rotational position about the longitudinal axis 60*x* of the spherical member 60 when in an engaged condition and allow rotational repositioning of the shaft 30 about the longitudinal axis 60*x* of the spherical member 60 without rotation of the spherical member 60 when in a disengaged condition. A preferred locking mechanism 40, shown in FIGS. 5, 11 and 17, is a wing nut 40 having a longitudinal threaded bore (not shown) extending completely through the wing nut 40 for threadably engaging the threaded first end section 31 of the shaft 30. The wing nut 40 is effective for locking the shaft 30 in a selected rotational position about the longitudinal axis 60*x* of the spherical member 60 by rotating the wing nut 40 in a first direction relative to the first end section 31 of the shaft 30 until the distal end 41 of the wing nut 40 engages the collar 70. The wing nut 40 can be disengaged for allow rotational repositioning of the shaft 30 about the longitudinal axis 60*x* of the spherical member 60 by simply rotating the wing nut 40 in a reverse direction relative to the first end portion 31 of the shaft 30 until the distal end 41 of the wing nut 40 disengages the collar 70.

The receiving member 80 is shown in greater detail in FIGS. 8 through 11. In a preferred embodiment, the receiving member 80 is generally Y-shaped, defined by a shoulder portion 81 and a clamping portion 82. The clamping portion 82 includes transversely spaced first and second arms, 83 and 84, which longitudinally extend in a substantially uniform fashion from the shoulder portion 81.

A threaded longitudinal bore 85 is preferably provided in the shoulder portion 81 of the receiving member 80 for threadably engaging the neck portion 24 of the handle 20.

The clamping portion 82 of the receiving member 80 includes opposed first and second arms 83 and 84, separated by a gap 87. In this regard, arms 83 and 84 preferably extend in a substantially identical fashion from the shoulder portion 81 of the receiving member 80. Each of the first arm 83 and second arm 84 has an inner surface 83*i* and 84*i*, and an outer surface 83*o* and 84*o*, respectively. Transversely aligned apertures 88' and 88", transversely aligned connector receiving bores 89' and 89", and transversely aligned spacing adjustment mechanism receiving bores 90' and 90" extend through the first and second arms 83 and 84, respectively. The apertures 88' and 88" are longitudinally spaced from the connector receiving bores 89' and 89" towards the distal ends 83*d* and 84*d* of the first and second arms 83 and 84 respectively. The adjustment mechanism receiving bores 90' and 90" are longitudinally spaced from the connector receiving bores 89' and 89" towards the proximal ends 83*p* and 84*p* of the first and second arms 83 and 84 respectively.

The first and second arms 83 and 84 are preferably formed such that the outer surfaces 83*o* and 84*o* of the arms 83 and 84 are substantially flat and have a width in the range of 0.5-1.5 inches, more preferably in the range of 0.75-1.25 inches, and most preferably approximately 1 inch. The inner surfaces 83*i* and 84*i* of the first and second arms 83 and 84 are also preferably substantially flat with mirror image longitudinally extending concave channels 91' and 91" formed by the inner surfaces 83*i* and 84*i* of each arm 83 and 84 respectively. The concave channels 91' and 91" are preferably formed as mirror images, with each channel 91' and 91" extending from the distal ends 83*d* and 84*d* of the corresponding arm 83 and 84 to at least the apertures 88' and 88" in the corresponding arm 83 and 84. The concave channels 91' and 91" are sized in accordance with the diameter of the spherical member 60 to facilitate initial introduction of the spherical member 60 into frictional engagement within the gap 87 between the arms 83 and 84 and transversely centered within the apertures 88' and 88". Thus in a preferred embodiment, the transverse height of the gap 87 between the arms 83 and 84 is substantially less than the diameter of the spherical member 60 except at the nadirs (unnumbered) of the concave channels 91' and 91" where the transverse height of the gap 87 is only slightly smaller than the diameter of the spherical member 60 so as to facilitate initial introduction of the spherical member 60 within the gap 87 separating the arms 83 and 84 with the spherical member 60 transversely centered within the apertures 88' and 88" in the arms 83 and 84. Alternatively, other assembly techniques may be employed in which the concave channels 91' and 91" need not be formed.

Figure 8:
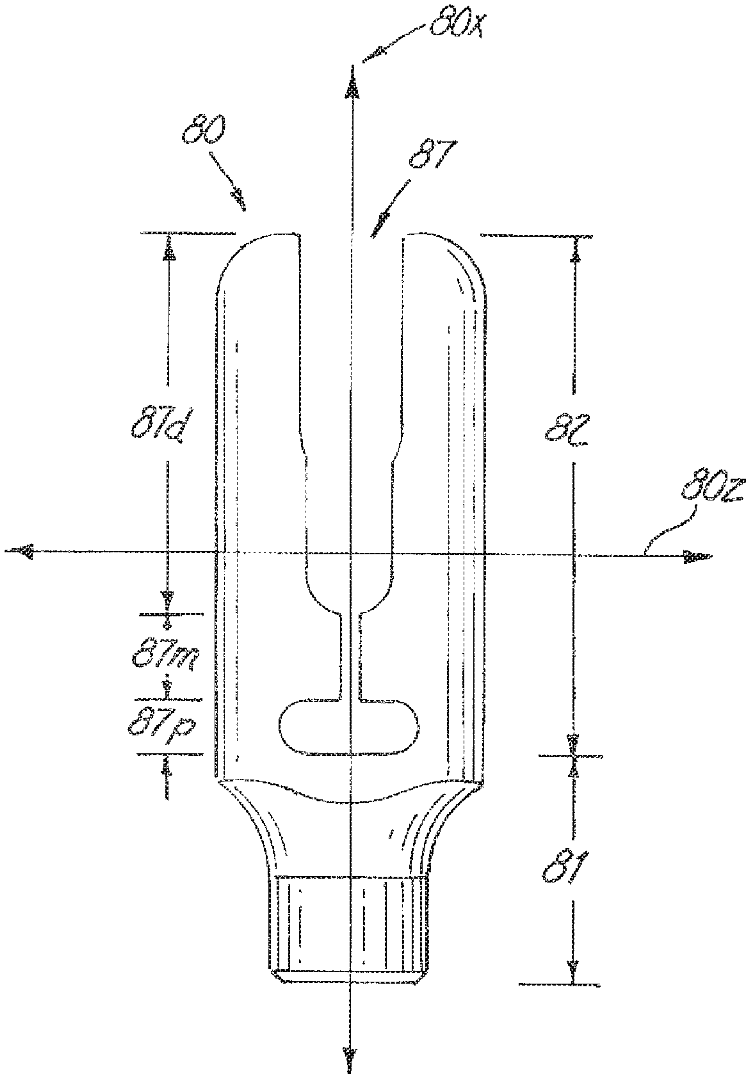
FIG. 8 is front view of the receiving member shown in FIG. 5.
Figure 9:
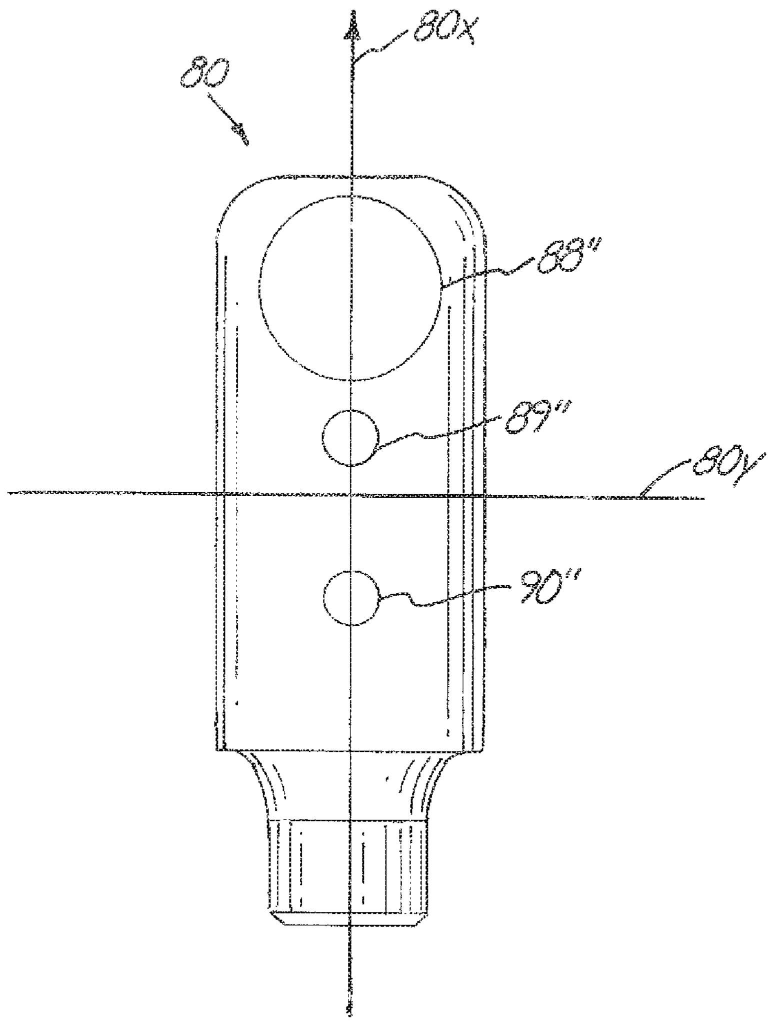
FIG. 9 is a right side view of the receiving member shown in FIG. 5.
Figure 10:
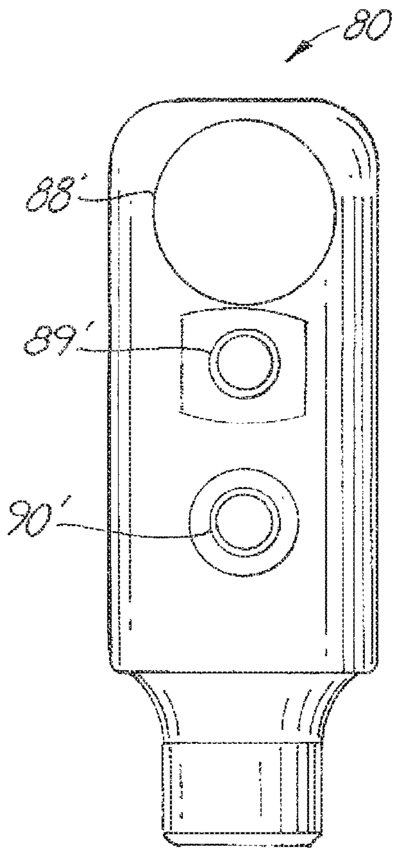
FIG. 10 is a left side view of the receiving member shown in FIG. 5.

As depicted in FIGS. 8 and 11, the gap 87 separates the first arm 83 and second arm 84 and extends the entire longitudinal length and lateral width of the clamping portion 82 of the receiving member 80. The gap 87 preferably defines a distal region 87*d*, a middle region 87*m* and a proximal region 87*p* with the transverse height of the gap 87 in the distal region 87*d* greater than the height of the gap 87 in the middle region 87*m* and the transverse height of the gap 87 in the proximal region 87*p* greater than the height of the gap 87 in the distal region 87*d*. In other words, the transverse spacing between the first arm 83 and the second arm 84 is greatest in the proximal region 87*p* and least in the middle region 87*m*. The distal region 87*d* preferably encompasses the apertures 88' and 88" and the connector receiving bores 89' and 89", while the middle region 87*m* preferably encompasses the adjustment mechanism receiving bores 90' and 90". The transverse height of the distal region 87*d* is selected to accommodate the spherical member 60 within the gap 87, accommodate passage of the collar 70 and the first end section 31 of the shaft 30 into the gap 87 and into engagement with the spherical member 60 retained within the gap 87, and permit lateral pivoting of the collar 70 and the first end section 31 of the shaft 30 within the gap 87. More particularly, the transverse height of the distal region 87*d* is preferably less than the diameter of the spherical member 60 such that the spherical member 60 is retainable between the first arm 83 and the second arm 84 when the connector 100 is in a disengaged condition. In addition, the transverse height of the distal region 87*d*, the diameter of the spherical member 60 and the thickness of the first end section 31 of the shaft 30 are preferably selected so that the shaft 30 does not interfere with locking engagement of the spherical member 60 between the arms 83 and 84 by actuation of the connector 100. Generally, a transverse height of approximately 0.4 inches is acceptable. Alternatively, other transverse heights are equally acceptable.

As described below, the gap 87 allows the first arm 83 and second arm 84 to be deflected toward or away from one another by (i) actuation of the connector 100 so as to lock the spherical member 60 in position relative to the receiving member 80 when in an engaged condition and allow repositioning of the spherical member 60 relative to the receiving member 80 when in a disengaged condition, and (ii) actuation of the spacing adjustment mechanism 120 so as to adjustment the transverse height of the distal region 87*d* of the gap 87 from time to time and thereby maintain a desired tolerance between the diameter of the spherical member 60 and the height of the distal region 87*d* of the gap 87 as the components are subjected to wear and tear. A variety of factors can impact the extent to which the first arm 83 and second arm 84 can be deflected by the connector 100, including the material of construction, the longitudinal length of the arms 83 and 84 defined by the longitudinal length of the gap 87, the thickness of the first arm 83 and second arm 84 proximate the shoulder portion 81 of the receiving member 80, the longitudinal placement of the apertures 88' and 88", the longitudinal placement of the connector receiving bores 89' and 89", and the longitudinal placement of the spacing adjustment receiving bores 90' and 90". As shown in FIGS. 8 and 11, the gap 87 can be configured with a proximal region 87*p* for purposes of facilitating deflection of the arms 83 and 84 towards one another when the spacing adjustment mechanism 120 is actuated (i.e., tightened). Alternatively, the gap 87 can be formed with a relatively uniform height along the entire longitudinal length of the gap 87.

Transversely aligned and transversely extending apertures 88' and 88" are formed in the first and second arms 83 and 84 respectively. The apertures 88' and 88" are configured and arranged to receive and maintain the spherical member 60. In a preferred embodiment, favored for ease of manufacture, the apertures 88' and 88" extend completely through the respective arm 83 and 84. Alternatively, the apertures 88' and 88" may be formed as a cylindrical concavity which does not extend completely through the arm 83 or 84, or may be formed as a dimple in the inner surfaces 83*i* and 84*i* of the respective arms 83 and 84. The apertures 88' and 88" have a diameter which is smaller than the diameter of the spherical member 60 to prevent the spherical member 60 from passing completely through the apertures 88' and 88". For example, a spherical member 60 having a diameter of 0.687 inches can be satisfactorily accommodated within apertures 88' and 88" having a diameter of 0.5 inches. Alternatively, other dimensions are equally acceptable.

The transversely aligned connector receiving bores 89' and 89" in the first and second arms 83 and 84 respectively, are longitudinally spaced from apertures 88' and 88" towards the shoulder portion 81 of the receiving member 80. The connector receiving bores 89' and 89" are longitudinally spaced from apertures 88' and 88" a distance sufficient to prevent the connector 100 from contacting and interfering with rotation of the spherical member 60 when the connector 100 is operably positioned within the connector receiving bores 89' and 89". However, the connector receiving bores 89' and 89" are preferably placed in relatively close longitudinal proximity to apertures 88' and 88" as the actuation force required to lock the spherical member 60 into position is reduced by positioning the connector 100 as close as possible to the distal ends 83*d* and 84*d* of the arms 83 and 84 respectively. For example, a center to center spacing of about 0.625 from the connector receiving bores 89' and 89" to the corresponding apertures 88' and 88" in each arm 83 and 84 is effective when the spherical member 60 has a diameter of 0.5 inches and the shank 101 of the connector 100 has a diameter of 0.25 inches.

The connector receiving bores 89' and 89" are configured to selectively retain the connector 100 as between an engaged condition wherein the arms 83 and 84 are deflected towards one another and the spherical member 60 is locked in position, and a disengaged condition wherein the arms 83 and 84 are not deflected and the spherical member 60 can be rotatably repositioned relative to the receiving member 80. For example, in one embodiment, the connector receiving bore 89' through the first arm 83 slidably engages the shank 101 of the connector 100 while preventing passage of the head 102 of the connector 100, while the connector receiving bore 89" through the second arm 84 is threaded for threadably engaging the shank 101 of the connector 100. Alternatively, other attachment configurations are equally acceptable.

The transversely aligned spacing adjustment bores 90' and 90" in the first and second arm 83 and 84 respectively, are longitudinally spaced from the connector receiving bores 89' and 89" towards the shoulder portion 81 of the receiving member 80. The spacing adjustment bores 90' and 90" are longitudinally spaced from the connector receiving bores 89' and 89" a distance effective for ensuring that users can readily attain the actuation force required to lock the spherical member 60 into position by hand actuation of the connector 100. For example, a center to center spacing of about 0.75 inches from the spacing adjustment bores 90' and 90" to the corresponding connector receiving bores 89' and 89" in each arm 83 and 84 is generally effective when the arms 83 and 84 are constructed from aluminum and have a lateral thickness of 0.5 inches in the distal region 87*d* of the gap 87.

The spacing adjustment bores 90' and 90" are configured to retain the spacing adjustment mechanism 120 and allow a periodic decrease in the transverse height of the distal region 87*d* of the gap 87 to compensate for wear and tear of the components by actuation of the spacing adjustment mechanism 120. For example, in one embodiment, the spacing adjustment bore 90' through the first arm 83 slidably engages the shank 121 of the spacing adjustment mechanism 120 while preventing passage of the head 122 of the spacing adjustment mechanism 120, while the spacing adjustment bore 90" through the second arm 84 is threaded for threadably engaging the shank 121 of the spacing adjustment mechanism 120. Alternatively, other attachment configurations are equally acceptable.

The entire receiving member 80, including the shoulder portion 81 and the clamping portion 82 is preferably a one-piece member integrally formed from a high strength deflectable material such as T6 aluminum. In some embodiments, any of the receiving members 80 disclosed have a shape memory such that arms 83 and 84 are inclined to substantially return to their original shape at the time of manufacture. In some of these embodiments, the arms 83,84 have had the transverse length of the gap between the arms increased in order to accommodate a spherical member 60 such that the arms 83, 84 exert a compressive force on the spherical member 60. In some embodiments, the adjustment mechanism 120 is tightened such that additional pressure is applied to the spherical member 60 other than that of the shape memory pressure. In some embodiments, the shape memory pressure snugly holds the spherical member 60 within the gap between the arms 83,84 while allowing the spherical member and shaft to be rotated into a desired position when operational force is applied; by tightening the adjustment mechanism 120 the spherical member 60 can be tightly locked into place such that the spherical member or shaft will not substantially rotate within the receiving member 80 during normal use of the different functional elements. It should be noted that while the spherical member also wants to return to a less compressed shape and applies pressure to the arms 83 and 84, the pressure between the spherical member and the arms is greater due to the shape memory of the receiving member as the arms want to return to their original shape. Thus in some embodiments both the spherical member and the receiving member are exerting substantial pressure on one another due to the shape memory each member has. When the spacing adjustment mechanism 120 is in the loosened position the shape memory pressure is greater than when the spacing adjustment mechanism is tightened.

The arms can exert an active force against the more reactive element (as shown here, a calibrated rubber sphere). The pretensioner arms are always in a state of activity as is the rubber sphere as the calibrated pretensioner arms are always competing with the rubber sphere for the space that it shares with the rubber shaft supported ball "sphere", which is designed to be larger than the space between the pretensioner arms. This space, the slot, can be calibrated and constructed to half the diameter of the inserted rubber sphere which is constructed at a specific durometer density. A durometer measure of between 80 and 100 can be used in some embodiments. A durometer measurement of about 90 is ideal in some embodiments. The ball can be more easily inserted through use of a jack screw that engages the pretensioner arms and can force the arms apart when loading the rubber sphere which provides "pretensioning". The pretensioner arms have been designed to incorporate an adjustment screw in its base for presetting variable working pressures. The pretensioner arms and screw(s) with compressed sphere has been designed to also accommodate painting accessories that can be screwed into the sphere shaft end, such as a squeegee, paint brush, scraper and any painting device that can be advantaged using. The pretensioner arms and screw(s) with compressed sphere can also be used in clutch drive system couplers and vibration dampening shaft drives on automobiles, and to prevent catastrophic coupler failure if configured for load. They also find application as an alternative pump coupler.

In some embodiments, the operational force is the force that an average person would apply by hand. In some embodiments this force is approximately 2.5-10.0 lbs. In some embodiments the operational force is less than about 30% of the force necessary to rotate the spherical member when the spherical member is in the tightened position. It should be noted however that in some embodiments of the paint roller having the protrusion claimed herein the spherical member freely rotates within the gap when the connector is in the open position.

The shaft 30 and thereby the tube-receiving frame 130 can be manually repositioned relative to the handle 20 after the locking mechanism 40 and/or the connector 100 is loosened. Upon loosening the locking mechanism 40, the shaft 30 can be rotated about the longitudinal axis 20*x* of the handle 20 by effecting rotation of the first end 31 of the shaft 30 within the collar 70 retained within the spherical member 60. Upon loosening the connector 100, the shaft 30 can be laterally repositioned relative to the handle 20 by effecting rotation of the spherical member 60 about the transverse axis 60*z* of the spherical member 60 within the receiving member 80. Transverse repositioning of the shaft 30 relative to the handle 20 is limited by arms 83 and 84, which prevent continued transverse movement of the spherical member 60 when the distal ends 83*d* and 84*d* of the arms 83 and 84 contact the collar 70 or first end section 31 of the shaft 30.

The combination of the first end 31 of the shaft 30, the collar 70 and the locking mechanism 40 can be configured, arranged and connected to allow 360° rotation of the shaft 30 about the longitudinal axis 20*x* of the handle 20.

The flexure joint 50 can be configured and arranged to allow at least a 30°, preferably at least a 60°, and most preferably at least a 90°, rotation of the shaft 30 about the transverse axis 60*z* of the spherical member 60 in both clockwise and counter-clockwise directions from the longitudinal axis 20*x* of the handle 20.

Once the shaft 30 and thus the tube-receiving frame 130 and tubular paint applicator 140 is located in the desired angular and rotational position relative to the handle 20, the shaft 30 can be locked into position by tightening the locking mechanism 40 and the connector 100 so as to lock the spherical member 60 into position within the clamping portion 82 of the receiving member 80. The paint roller 10 is then available for use.

The tube-receiving frame 130 and tubular paint applicator 140 can be quickly and easily repositioned relative to the handle 20 by loosening one or both of the locking mechanism 40 and the connector 100, depending upon the need to rotate about shaft 30 about the longitudinal 20*x* and/or transverse 20*z* axes of the handle 20 to achieve the desired repositioning, effecting the desired amount of rotation of the shaft 30 relative to the receiving member 80, and then retightening the locking mechanism 40 and/or connector 100.

The paint roller 10 with flexure joint 50 of the present invention provides a marked improvement over the standard paint roller design. By providing a user with the ability to easily change orientation of an attached tubular paint applicator 140 relative to the handle 20, a wide variety of new applications for the paint roller 10 are now available. For example, a simple rotation of the shaft 30 relative to the handle 20 facilitates painting a corner. Additionally, transversely angling the tubular paint applicator 140 from the longitudinal axis 20*x* of the handle 20 facilitates the horizontal painting of elevated surfaces. Finally, the ability to adjust the position of the tubular paint applicator 140 relative to the handle 20 allows the paint roller 10 to be used in a more ergonomically correct position for a variety of painting directions and positions, thus minimizing the stresses placed upon the wrist, arm, shoulder and back of a user.

Although the present invention has been described with reference to preferred embodiments, workers skilled in the art recognize that changes may be made in form and detail without departing from the spirit and scope of the invention. For example, the paint roller 10 of the present invention has been described as relating to a standard size. It would be recognized by those skilled in the art that the paint roller 10 can be constructed to substantially any desired sized. In addition, the paint roller 10 may utilize a shaft 30, which does not have the standard U-shaped section 33. Similarly, while the spherical member 60 has been described as round with a smooth surface, other shapes and surface textures, such as an egg shaped member with a knurled surface, may also be employed.

In light of the disclosure provided herein, other options for providing the desired lateral repositionability of the shaft 30 relative to the handle 20 would be known to those skilled in the art. One such option is replacement of the spherical member 60 and associated apertures 88' and 88" in the arms 83 and 84 with a spindle (not shown) rotatably mounted within bearings (not shown) in the arms 83 and 84. The spindle version would further replace the connector 100 and connector receiving bores 89' and 89" in the arms 83 and 84 with a releasable catch system such as a ratchet-type assembly (not shown) or a pin retention system (not shown) for locking the spindle into position.

It is not necessary that the flexure joint 50 provide the multiple degrees of freedom offered by the preferred embodiments disclosed herein. The claimed invention includes paint rollers 10 having a flexure joint 50, which provides fewer degrees of freedom.

The protrusion 132 can keep the roller from sliding off and can act as a painting guide. The protrusion can allow a user to "cut into the grid" of a corner between two walls or between a wall and a ceiling by acting as a guide to allow the paint roller to paint the surface to within a close proximity of the adjacent wall (as used herein the term adjacent wall can also include a ceiling or floor) without getting paint on the adjacent wall. In some instances the surface can be painted to within a half inch, a quarter inch, an eighth an inch, or less of an adjacent wall. The protrusion 132 can be of one piece construction or of multi-piece construction. The frame 130 can also be constructed to have the protrusion 132 extending from the frame but without the protrusion 132 extending from an opening 137 of the frame as the frame itself can be constructed to have the dimensions of the protrusions as described herein without having an additional piece to insert into the frame. The thickness of the protrusion can be between about 1/16th of an inch to one inch. The thickness of the protrusion can be the distance measured from the proximal end of the protrusion when attached to the distal end of the frame to the distal most end of the protrusion. The protrusion can attach to an opening in the distal end of the frame 130 (e.g. a friction fit, a compression fit, a threaded fit, or the like). The parts of the protrusion in the multi-piece construction can be likewise attached to one another.

In some embodiments the inventive protrusion of the frame 130 is formed by removing an insert from the end of a typical frame and reinserting the inventive protrusion 132. In some embodiments a portion of the end of the frame is removed and the inventive protrusion 132 is then placed into the frame 130. The insert can be sized to fit a variety of opening sizes within the frame 130.

Figure 18:
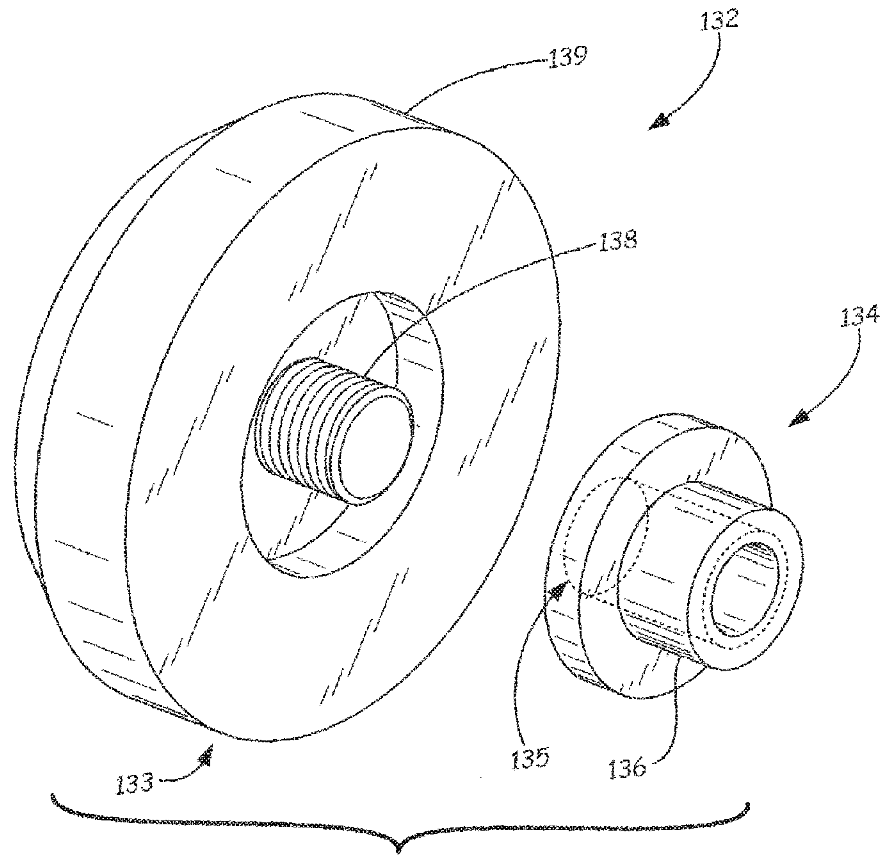
FIG. 18 is a perspective view of two parts comprising the protrusion.
Figure 19:
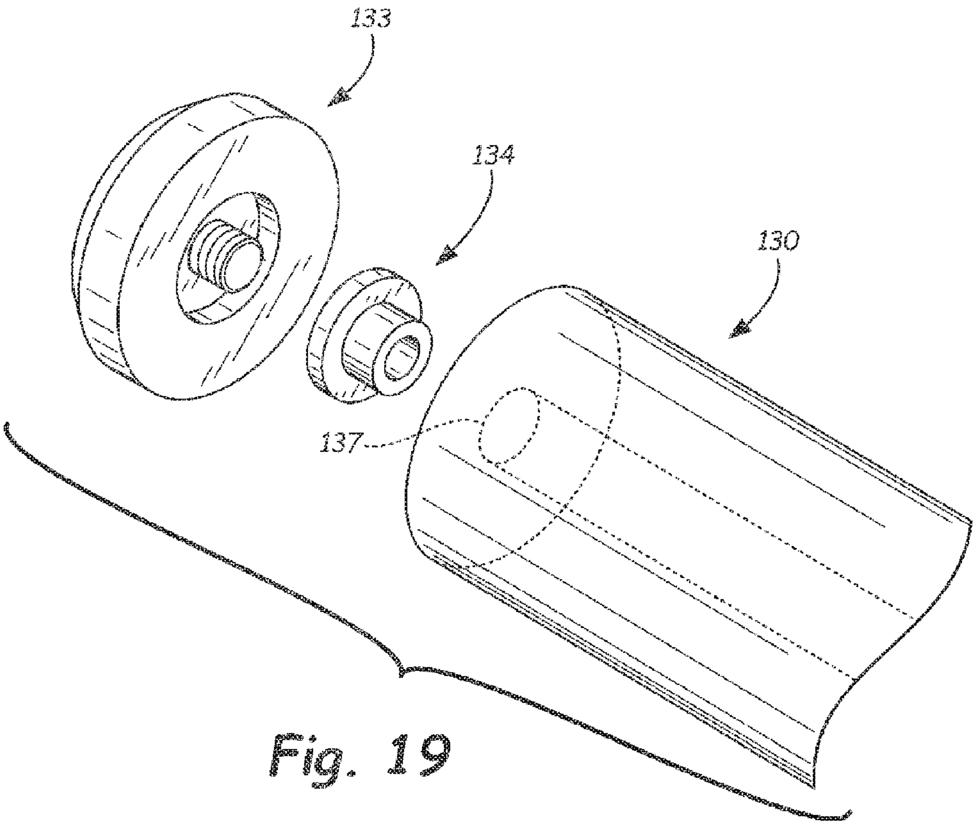
FIG. 19 is a perspective view of two parts comprising the protrusion as it would attach to a frame.
Figure 20:
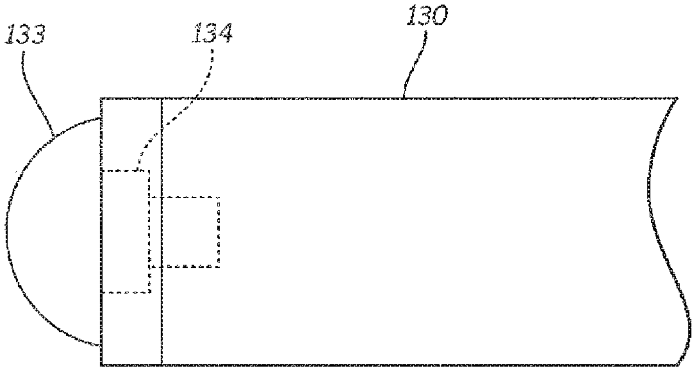
FIG. 20 is a side view of a frame with the protrusion components as illustrated in FIG. 18.

As depicted in FIGS. 18-20, the protrusion 132 comprises two parts, a cap 133 and an insert 134. The insert can be hollow and have an opening 135 there through as shown. The proximal portion of the insert has an extending portion 136 of a smaller diameter than the distal end of the insert 134. The extending portion 136 is sized to fit into the opening 137 at the distal end of the frame 130 thereby attaching to the frame. The frame 130 of FIGS. 19-20 is illustrative and can be similar to the frame 130 of FIGS. 5 and 17. The cap 133 has a cap fastening portion 138 which can attach to the opening 135 of the insert 134 such that the cap is affixed to the frame 130. It should be noted that the opening 135 of the insert need not pass completely through the insert 134.

The cap 133 can be of a variety of diameters. In FIGS. 18-20 the larger proximal cap portion 139 can have a diameter substantially equal to that of the distal end of the frame 130. In some embodiments the proximal cap portion includes a roughened surface that can improve grippability of the surface of the cap 133 in order to remove it from the frame 130.

Figure 21:
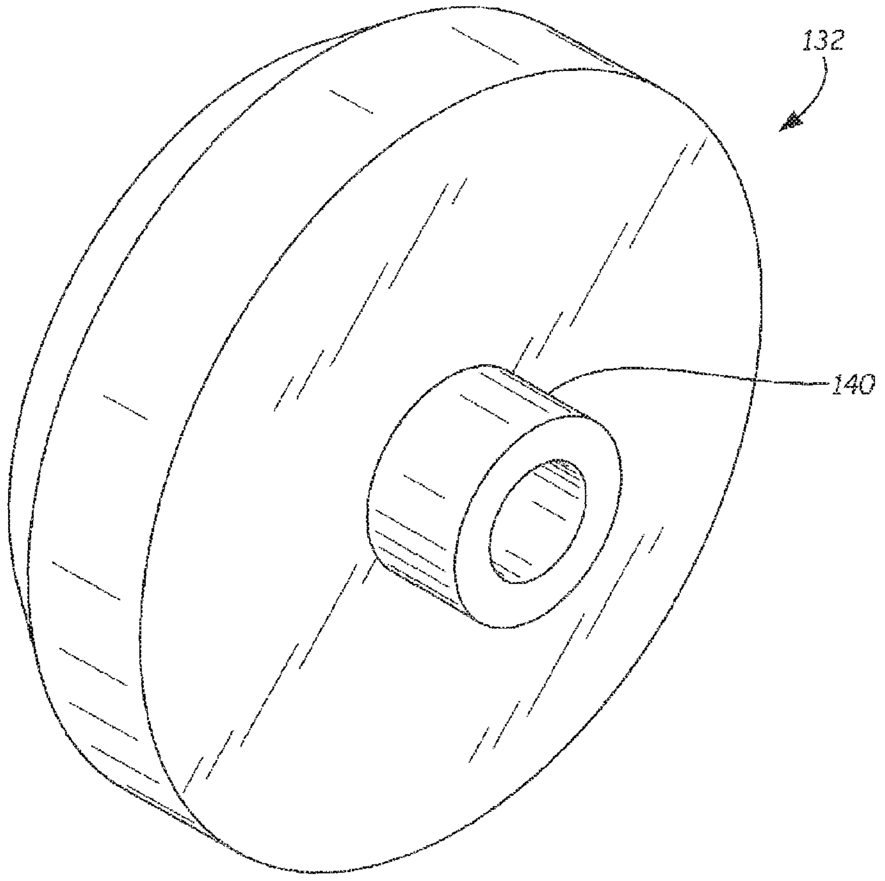
FIG. 21 is a perspective view of the protrusion having a one-piece construction.

In some embodiments, as depicted in FIG. 21, the protrusion 132 is of one piece construction. The protrusion 132 has a protrusion extension 140 that can fit into the opening 137 of frame 130 much in the manner extending portion 136 of insert 134 fits into the frame. The protrusion extension 140 can engage the opening in a variety of ways (e.g. a friction fit, a compression fit, a threaded fit, or the like). The protrusion extension 140 can itself be threaded to mate with a threaded opening 137.

The above disclosure is intended to be illustrative and not exhaustive. This description will suggest many variations and alternatives to one of ordinary skill in this art. The various elements shown in the individual figures and described above can be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art can recognize other equivalents to the specific embodiment described herein which equivalents are intended to be encompassed by the claims attached hereto.

What is claimed:

1. A flexure joint interposed between and connecting a painting tool and a handle, the flexure joint including:

(i) spherical member;

(ii) a one piece receiving member configured and arranged to maintain and selectively engage the spherical member, the one piece receiving member including a first arm and an opposing second arm, the first and second arms defining a gap therebetween, wherein the spherical member is positioned within the gap in frictional engagement with the receiving member when the first and second arms are in a relaxed state; and (iii) a connector in communication with the one piece receiving member for releasably locking the spherical member in position as between at least a first locked position and a second locked position relative to the one piece receiving member, the connector configured to compress the first and second arms against the spherical member to lock the spherical member in position, the connector having an open position when the spherical member is released; whereby repositioning of the spherical member as between the first and the second locked positions is effective for repositioning the painting tool relative to the handle as between the first locked position and the second locked position.

2. The flexure joint of claim 1, further comprising a spacing adjustment mechanism configured to adjust a dimension of the gap.

3. The flexure joint of claim 2 wherein the spacing adjustment mechanism comprises a threaded hole in the one piece receiving member and a bolt that engages the threaded hole.

4. The flexure joint of claim 1, wherein the spherical member is a rubber material having a durometer measurement in the range of about 80 to about 100.

5. The flexure joint of claim 1, wherein the spherical member is metal.

6. The flexure joint of claim 1, wherein the spherical member includes a threaded bore configured to couple the painting tool.

7. The flexure joint of claim 1, wherein the painting tool is one of a paint roller, a paint brush, a paint scraper, a paint pad, and a sanding block.

8. The flexure joint of claim 1, wherein the one piece receiving member defines a shoulder portion and a clamping portion, the clamping portion including the first and second arms which extend from the shoulder portion, the shoulder portion defines a transverse opening that is wider than the gap.

9. The flexure joint of claim 1, wherein the connector is configured to be removed from the receiving member and reinserted into the receiving member in an opposite direction, the reinserted connector configured to temporarily enlarge the gap for insertion or removal of the spherical member from the receiving member.

10. The flexure joint of claim 1, wherein the spherical member is rubber and is molded around a metal collar member, the metal collar member configured to couple to the painting tool.

* * * * *